(12) United States Patent
Chen

(10) Patent No.: US 10,602,901 B2
(45) Date of Patent: *Mar. 31, 2020

(54) RIDING FLOOR CLEANING MACHINES HAVING INTELLIGENT SYSTEMS, ASSOCIATED SUB-ASSEMBLIES INCORPORATING INTELLIGENT SYSTEMS, AND ASSOCIATED METHODS OF USE

(71) Applicant: Nai Pong Simon Chen, Shanghai (CN)

(72) Inventor: Nai Pong Simon Chen, Shanghai (CN)

(73) Assignee: Intelligent Cleaning Equipment Holdings Co., Ltd. (VG)

( * ) Notice: Subject to any disclaimer, the term of this patent is extended or adjusted under 35 U.S.C. 154(b) by 0 days.

This patent is subject to a terminal disclaimer.

(21) Appl. No.: 16/026,716

(22) Filed: Jul. 3, 2018

(65) Prior Publication Data

US 2018/0317731 A1    Nov. 8, 2018

Related U.S. Application Data

(63) Continuation of application No. 14/667,507, filed on Mar. 24, 2015, now Pat. No. 10,010,230.

(Continued)

(51) Int. Cl.
  *G08B 21/00*       (2006.01)
  *A47L 11/40*       (2006.01)
  (Continued)

(52) U.S. Cl.
  CPC ......... *A47L 11/4011* (2013.01); *A47L 11/283* (2013.01); *A47L 11/4008* (2013.01);
  (Continued)

(58) Field of Classification Search
  None
  See application file for complete search history.

(56) References Cited

U.S. PATENT DOCUMENTS 3,204,280 A    9/1965   Campbell
3,761,987 A   10/1973   Nayfa et al.
(Continued)

FOREIGN PATENT DOCUMENTS

CN    101292853    10/2008
CN    202830837     3/2013
(Continued)

OTHER PUBLICATIONS

PCT Written Opinion of the International Searching Authority for International Application No. PCT/US15/022310 dated Jul. 16, 2015.

*Primary Examiner* — Julie B Lieu
(74) *Attorney, Agent, or Firm* — King & Partners, PLC

(57) ABSTRACT

A riding floor cleaning machine having an intelligent system including a main frame sub-assembly, a steering and drive wheel sub-assembly, a solution tank sub-assembly, a recovery tank sub-assembly, a recovery tank cover sub-assembly, a control panel sub-assembly, a main controller sub-assembly, a seat and detergent system sub-assembly, a battery sub-assembly, a scrub head sub-assembly, a scrub head lift sub-assembly, a squeegee sub-assembly, a solution and detergent sub-assembly, and an intelligent system associated with at least one of the above-identified sub-assemblies, wherein the intelligent system selectively gathers, obtains, monitors, stores, records, and/or analyzes data associated with components of the riding floor cleaning machine, and controllably communicates and/or disseminates such data with another system and/or user.

5 Claims, 22 Drawing Sheets

Related U.S. Application Data

(60) Provisional application No. 61/969,559, filed on Mar. 24, 2014.

(51) Int. Cl.
  *H04Q 9/00* (2006.01)
  *G06Q 10/00* (2012.01)
  *A47L 11/283* (2006.01)
  *G06Q 30/06* (2012.01)

(52) U.S. Cl.
  CPC ....... *A47L 11/4013* (2013.01); *A47L 11/4044* (2013.01); *A47L 11/4055* (2013.01); *A47L 11/4061* (2013.01); *A47L 11/4083* (2013.01); *G06Q 10/20* (2013.01); *G06Q 30/0633* (2013.01); *H04Q 9/00* (2013.01); *H04Q 2209/43* (2013.01); *H04Q 2209/823* (2013.01)

(56) References Cited

U.S. PATENT DOCUMENTS

| | | | |
|---|---|---|---|
| 3,879,789 A | 4/1975 | Kasper | |
| 3,974,541 A | 8/1976 | Silvis et al. | |
| 4,369,544 A | 1/1983 | Parisi | |
| 4,580,313 A | 4/1986 | Blehert | |
| 4,667,364 A * | 5/1987 | Meili | A47L 11/293 15/319 |
| 4,675,935 A * | 6/1987 | Kasper | A47L 11/4011 15/319 |
| 4,716,621 A | 1/1988 | Zoni | |
| 4,819,676 A | 4/1989 | Blehert et al. | |
| 4,831,684 A | 5/1989 | Duncan | |
| 5,093,955 A | 3/1992 | Blehert et al. | |
| 5,239,720 A | 8/1993 | Wood et al. | |
| 5,265,300 A | 11/1993 | O'Hara et al. | |
| 5,435,035 A * | 7/1995 | Fujimoto | A47L 11/162 15/49.1 |
| 6,519,808 B2 | 2/2003 | Legatt et al. | |
| 6,585,827 B2 | 7/2003 | Field et al. | |
| 7,199,711 B2 | 4/2007 | Field | |
| 7,269,877 B2 * | 9/2007 | Tondra | A47L 9/2805 15/319 |
| 7,403,360 B2 | 7/2008 | Cunningham | |
| 7,448,114 B2 | 11/2008 | Basham et al. | |
| 7,461,430 B2 | 12/2008 | Mitrisin et al. | |
| 7,533,435 B2 | 5/2009 | Pedlar et al. | |
| 7,891,046 B2 | 2/2011 | Field et al. | |
| 8,584,294 B2 * | 11/2013 | Loring | A47L 11/283 15/49.1 |
| 8,719,999 B2 | 5/2014 | Field | |
| 9,480,379 B2 | 11/2016 | Yoon | |
| 9,943,206 B2 | 4/2018 | Yang et al. | |
| 2001/0004719 A1 | 4/2001 | Sommer | |
| 2002/0156556 A1 * | 10/2002 | Ruffner | A01D 34/008 701/23 |
| 2003/0136666 A1 * | 7/2003 | Ophardt | H01M 8/04186 204/237 |
| 2005/0254185 A1 * | 11/2005 | Cunningham | A47L 5/38 361/23 |
| 2006/0150362 A1 | 7/2006 | Mitchell | |
| 2007/0186369 A1 * | 8/2007 | Field | A47L 11/302 15/320 |
| 2012/0097201 A1 * | 4/2012 | Field | A47L 11/302 134/58 R |
| 2012/0271645 A1 * | 10/2012 | Dain | G06Q 10/00 705/1.1 |
| 2015/0045990 A1 * | 2/2015 | Shih | A47L 11/4011 701/2 |
| 2016/0195577 A1 * | 7/2016 | Osaka | G01R 31/3662 204/407 |

FOREIGN PATENT DOCUMENTS

| | | |
|---|---|---|
| CN | 203034105 | 3/2013 |
| CN | 103866728 | 6/2014 |
| EP | 0 940 735 | 9/1999 |
| EP | 1 755 431 | 2/2007 |
| EP | 2 628 427 | 8/2013 |
| KR | 1020120016403 | 2/2012 |
| KR | 1020130027345 | 3/2013 |
| WO | WO 2003/041554 | 5/2003 |
| WO | WO 2007/092597 | 8/2007 |

* cited by examiner

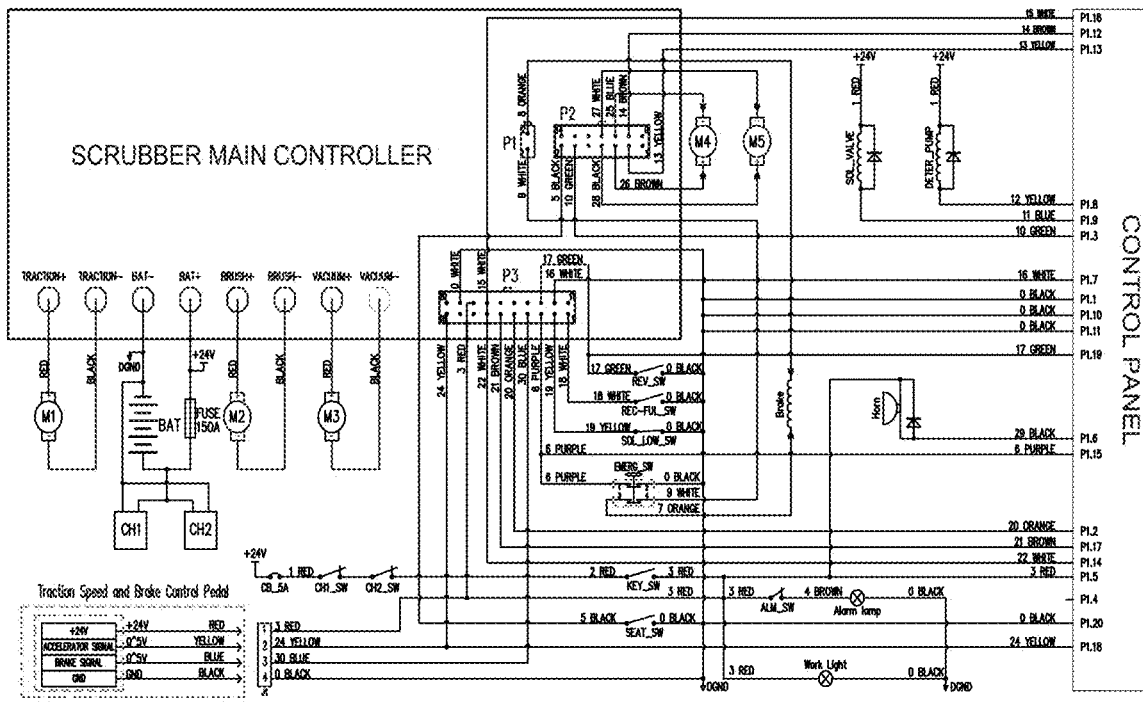

M1: Traction motor
BAT: 4-6V Batteries
CH1: Off-board battery charger port
CH2: On-board battery charger
M2: Brush motors
M3: Vacuum motor
CH1_SW: Off-board charger interlock switch
CH2_SW: On-board charger interlock switch M4: Scrub head lifting actuator
M5: Squeegee lifting actuator
SOL_VALVE: Solution flow solenoid valve
DETER_PUMP: Detergent flow pump
REV_SW: Reverse switch
REC_FUL_SW: Recovery tank water level switch
SOL_LOW_SW: Solution tank water level switch
EMERG_SW: Emergency stop switch Brake: Brake coil
Horn: Horn
KEY_SW: Main power key switch
SEAT_SW: Seat switch
ALM_SW: Alarm lamp switch
Alarm lamp: Alarm lamp
Work light: work LED light

Figure 17

RIDING FLOOR CLEANING MACHINES HAVING INTELLIGENT SYSTEMS, ASSOCIATED SUB-ASSEMBLIES INCORPORATING INTELLIGENT SYSTEMS, AND ASSOCIATED METHODS OF USE

CROSS-REFERENCE TO RELATED APPLICATIONS

This application is a continuation of U.S. application Ser. No. 14/667,507, filed Mar. 24, 2015, entitled "Riding Floor Cleaning Machines Having Intelligent Systems, Associated Sub-Assemblies Incorporating Intelligent Systems, And Associated Methods Of Use" which claims the benefit of U.S. Provisional Application Ser. No. 61/969,559, filed Mar. 24, 2014, entitled "Floor Cleaning Machine Assemblies Having Intelligent Systems, Associated Sub-Assemblies Incorporating Intelligent Systems, And Associated Methods Of Use," which is hereby incorporated herein by reference in its entirety—including all references and appendices cited therein.

BACKGROUND OF THE INVENTION

1. Field of the Invention

The present invention relates in general to riding floor cleaning machines and, more particularly, to riding floor cleaning machines having intelligent systems that have the capacity to selectively gather, obtain, monitor, store, record, and analyze data associated with components of the riding floor cleaning machines and controllably communicate and disseminate such data with other systems and users. The present invention further relates to riding floor cleaning machine sub-assemblies including, but not limited to, secondary electrochemical cells having intelligent systems, as well as associated methods for using the same.

2. Background Art

Floor cleaning machines and associated systems have been known in the art for years and are the subject of a plurality of patents and/or publications, including: U.S. Pat. No. 8,584,294 entitled "Floor Cleaner Scrub Head Having a Movable Disc Scrub Member," U.S. Pat. No. 7,448,114 entitled "Floor Sweeping and Scrubbing Machine," U.S. Pat. No. 7,269,877 entitled "Floor Care Appliance with Network Connectivity," U.S. Pat. No. 7,199,711 entitled "Mobile Floor Cleaner Data Communication," U.S. Pat. No. 5,265,300 entitled "Floor Scrubber," U.S. Pat. No. 5,239,720 entitled "Mobile Surface Cleaning Machine," U.S. Pat. No. 5,093,955 entitled "Combined Sweeper and Scrubber," U.S. Pat. No. 4,831,684 entitled "Cleaning Vehicles," U.S. Pat. No. 4,819,676 entitled "Combination Sweeping and Scrubbing System and Method," U.S. Pat. No. 4,716,621 entitled "Floor and Bounded Surface Sweeper Machine," U.S. Pat. No. 4,667,364 entitled "Floor-Cleaning Machine," U.S. Pat. No. 4,580,313 entitled "Walk Behind Floor Maintenance Machine," and European Patent Number 2,628,427 A2 entitled "Suction Device with a Suction Device Transmitter and External Communication Device Thereof,"—all of which are hereby incorporated herein by reference in their entirety including all references cited therein.

U.S. Pat. No. 8,584,294 appears to disclose a scrub head that includes a first disc scrub member, a movable support having first and second positions, and a movable disc scrub member. The first disc scrub member is rotatable about a first vertical axis. The movable disc scrub member is rotatable about a second vertical axis and is connected to the movable support. The movable disc scrub member is configured to move relative to the first disc scrub member along first and second orthogonal axes of a horizontal plane, which is transverse to the first and second vertical axes, between first and second positions respectively corresponding to the first and second positions of the movable support.

U.S. Pat. No. 7,448,114 appears to disclose a hard floor sweeping and scrubbing machine which includes a mobile body comprising a frame supported on wheels for travel over a surface, a motorized cleaning head, a waste hopper, a hopper lift and a vacuum squeegee. The motorized cleaning head is attached to the mobile body and is configured to perform sweeping and scrubbing operations on the surface. The waste hopper is positioned on a rear side of the cleaning head and is configured to receive waste discharged from the cleaning head during the surface sweeping operations. The hopper lift is configured to raise the waste hopper from an operating position, in which the waste hopper is positioned adjacent the cleaning head, to a dumping position, in which the waste hopper is positioned to dump waste collected in the waste hopper. In one embodiment, the vacuum squeegee is attached to the hopper lift. Also disclosed is a method of cleaning a surface using embodiments of the machine.

U.S. Pat. No. 7,269,877 appears to disclose a floor care appliance that includes a microprocessor based control arrangement having a communications port for connection to a computer. Once connected to a computer, software updates for the microprocessor may be downloaded or diagnostic information stored in the microprocessor's memory may be uploaded for diagnostic purposes. In one embodiment of the invention, the communication port is configured to be connected to a local computer for possible further connection to a remote computer over a computer or telephone network. In an alternate embodiment of the invention, the communication port is configured to connect to and dial up a remote computer over a telephone network.

U.S. Pat. No. 7,199,711 appears to disclose a method of communicating data from a mobile floor cleaner to a remote receiver a data communication is initiated from a communicator of the mobile floor cleaner to the remote receiver and data is communicated to the remote receiver with the communicator.

U.S. Pat. No. 5,265,300 appears to disclose a floor scrubbing vehicle having scrub brushes mounted at the rear of the vehicle by a mechanism which allows both the brushes and squeegee to extend and retract transversely with respect to the vehicle. The mechanism is resilient, and allows the scrub brushes and squeegee to automatically retract inward upon contact with an immovable obstacle, and also causes automatic extension of the brushes and squeegee following passage of the obstacle. The scrub brushes and squeegee are mounted in a scrubbing pod frame which can rotate about a vertical axis with respect to the vehicle to prevent damage, or to facilitate access for repair and maintenance.

U.S. Pat. No. 5,239,720 appears to disclose a surface cleaning machine as a combination sweeping-scrubbing apparatus including a sweeping brush for sweeping debris into a hopper and a one piece squeegee for picking up solution after four staggered, disc brushes. The squeegee is U-shaped having a longitudinal extent greater than that of the disc brushes located intermediate the legs of the squeegee. The drive wheel is located in front of the disc brushes, the squeegee and the solution applying means. The squeegee is raised and lowered relative to the frame by an actuator which pivots an L-shaped member, the leg of which abuts against and pivots a lever interconnected to the mount or the squeegee by a turnbuckle. The hopper is raised and simultaneously tilted by a single cylinder which pivots the upper arm of a parallelogram including a lower arm. The hopper is pivotally mounted to an end of a hopper arm, the opposite end of which is pivotally mounted to the end of the upper arm, and is further pivotally mounted to the end of the lower arm. The hopper is simultaneously tilted at a generally constant dump angle as the hopper is raised from a lowered position in a horizontal debris collecting condition to a raised position with the hopper in a dumping condition.

U.S. Pat. No. 5,093,955 appears to disclose a combination floor sweeping and scrubbing machine which is as compact and maneuverable as an equivalent machine which only sweeps or scrubs, while retaining typical hopper and tank volumes. Its operator can change it from sweeping to scrubbing or vice versa at any time by moving a few controls and without adding or removing any parts. It has one debris hopper and one horizontal cylindrical rotating brush and they function in both the sweeping and scrubbing modes. A vacuum system supplies dust control during sweeping and vacuum pickup of dirty solution during scrubbing. In the scrubbing mode a single tank supplies scrubbing solution and receives dirty solution picked up from the floor.

U.S. Pat. No. 4,831,684 appears to disclose a self-propelled sweeper vehicle that has front steerable wheels mounted on a centrally pivoted axle assembly which also carries the nozzle and brush gear whereby these assemblies are steered in unison with the vehicle. The nozzle front edge is convex and promotes non-turbulent air intake. The nozzle is formed as a hollow rotationally molded structure of a plastics material having inherent structural strength and stiffness. The brush gear is mounted on linkages comprising inner and outer portions pivotally connected for folding movement to resiliently yield under impact. The brush covers are formed as hollow plastics moldings and part of the brush support structure.

U.S. Pat. No. 4,819,676 appears to disclose a machine and/or system as well as a method of operation and an assembly whereby a sweeping unit may be quickly converted into a scrubbing unit and vice versa. The system is capable of operation either in a sweeping mode or a scrubbing mode and is also adaptable to include a vacuum wand assembly when the unit is to be operated in its sweeping mode.

U.S. Pat. No. 4,716,621 appears to disclose a sweeper machine for floors and bounded surfaces, e.g. the floors of workshops and warehouses, courtyards, having engaged with the machine frame, a removable container for collecting the swept trash supported by pivotally-mounted guides engaged by swivel members extending in a crosswise direction to the machine's longitudinal axis and cooperating to define a small frame intervening sealingly between a suction assembly in the frame and a suction mouth of the container, and with snap-action hook-up elements provided between the frame and the pivotally mounted guides and spring members projecting from the frame and acting by spring contact on the container.

U.S. Pat. No. 4,667,364 appears to disclose a riding floor cleaning machine which the fresh water and product dosing operation is controlled as a function of the operation of the driving motor such that the dosing per unit of floor area is maintained at an operator-controllable level. Improved economy of water, product and energy is achieved.

U.S. Pat. No. 4,580,313 appears to disclose a walk behind floor maintenance machine that includes a filter and filter housing that may be pivoted away to permit removal of the debris hopper. The filter may be cleaned by vibrating the filter and filter housing. Dust vibrated from the filter slides into the hopper. The hopper may be manually removed for emptying.

European Patent Number 2,628,427 A2 appears to disclose a device which has a suction motor and a dust collecting chamber arranged in a suction housing. A suction device-communication unit communicates with external communication units that form a component of a hand-held power tool. The external communication units are operated at a distance to the housing in connection with the tool. The suction device-communication unit includes a suction device transmitter for transmitting a control signal and/or a status signal to the external communication units. An independent claim is also included for an external communication unit for cooperation with a hand-held power tool.

While the above-identified patents and/or publications do appear to disclose various riding floor cleaning machines and associated systems, their configurations remain non-desirous, incompatible, and/or problematic inasmuch as, among other things, none of the above-identified riding floor cleaning machines and associated systems appear to include assemblies having intelligent systems that have the capacity to selectively gather, obtain, monitor, store, record, and analyze data associated with components of the riding floor cleaning machines and controllably communicate and disseminate such data with other systems and users. Furthermore, none of the above-identified riding floor cleaning machines and associated systems appear to utilize and/or be compatible with intelligent systems associated with secondary electrochemical cell sub-assemblies.

It is therefore an object of the present invention to provide riding floor cleaning machines having intelligent systems that have the capacity to selectively gather, obtain, monitor, store, record, and analyze data associated with components of the riding floor cleaning machines and controllably communicate and disseminate such data with other systems and users, as well as provide riding floor cleaning machines that are compatible with secondary electrochemical cells having intelligent systems associated therewith.

These and other objects of the present invention will become apparent in light of the present specification, claims, and appended drawings.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein:

FIG. 17 of the drawings is a wiring diagram of a riding floor cleaning machine fabricated in accordance with the present invention;

SUMMARY OF THE INVENTION

Figure 1:
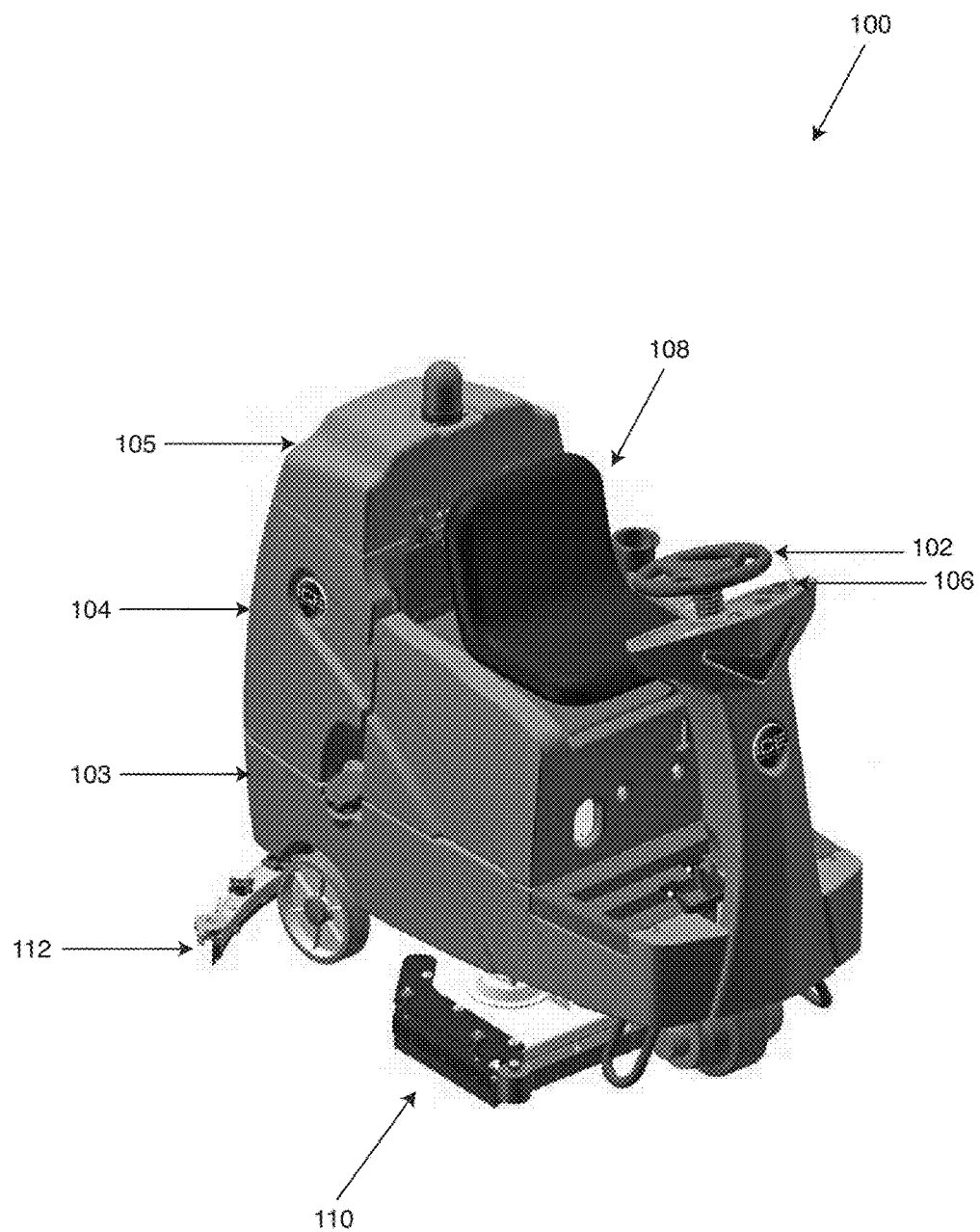
FIG. 1 of the drawings is a right front perspective view of a riding floor cleaning machine fabricated in accordance with the present invention.
Figure 2:
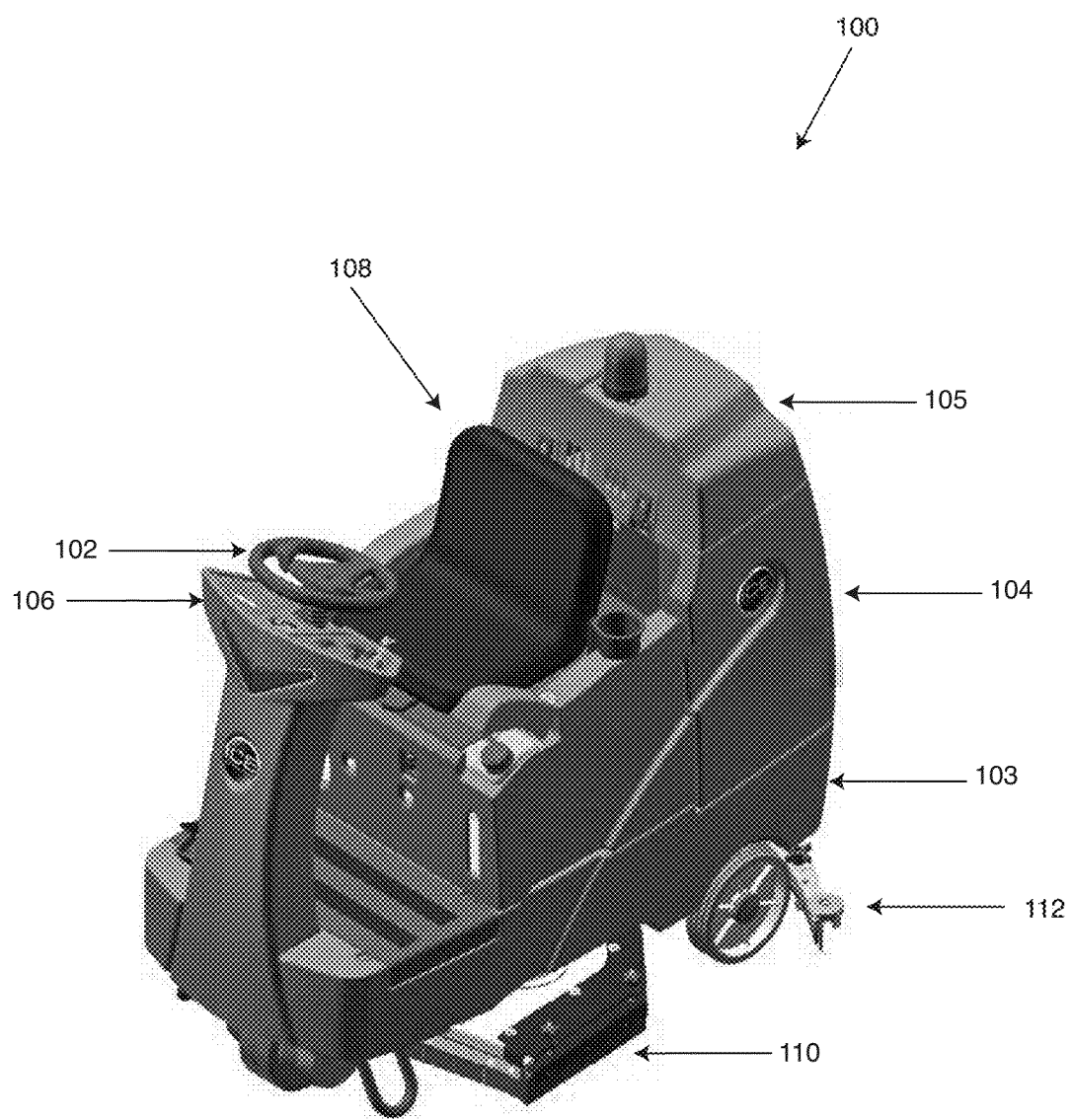
FIG. 2 of the drawings is a left front perspective view of a riding floor cleaning machine fabricated in accordance with the present invention.
Figure 3:
FIG. 3 of the drawings is a rear perspective view of a riding floor cleaning machine fabricated in accordance with the present invention.

The present invention is directed to, in one embodiment, a riding floor cleaning machine having an intelligent system comprising, consisting essentially of, and/or consisting of: (1) a main frame sub-assembly; (2) a steering and drive wheel sub-assembly; (3) a solution tank sub-assembly; (4) a recovery tank sub-assembly; (5) a recovery tank cover sub-assembly; (6) a control panel sub-assembly; (7) a main controller sub-assembly; (8) a seat and detergent system sub-assembly; (9) a battery sub-assembly; (10) a scrub head sub-assembly; (11) a scrub head lift sub-assembly; (12) a squeegee sub-assembly; (13) a solution and detergent sub-assembly; and (14) an intelligent system associated with at least one of the above-identified sub-assemblies, wherein the intelligent system at least one of selectively gathers, obtains, monitors, stores, records, and analyzes data associated with components of the riding floor cleaning machine, and at least one of controllably communicates and disseminates such data with at least one of another system and user.

The present invention is also directed to, in one embodiment, a sub-assembly having an intelligent system for a riding floor cleaning machine, comprising, consisting essentially of, and/or consisting of: (1) a primary and/or secondary electrochemical cell; and (2) an intelligent system, wherein the intelligent system at least one of selectively gathers, obtains, monitors, stores, records, and analyzes data associated with components of the riding floor cleaning machine, and at least one of controllably communicates and disseminates such data with at least one of another system and user.

The present invention is additionally directed to, in one embodiment, a method for using an intelligent system with a riding floor cleaning machine assembly comprising, consisting essentially of, and/or consisting of the steps of: (1) providing a riding floor cleaning machine assembly having an intelligent system; (2) selectively gathering, obtaining, monitoring, storing, recording, and/or analyzing data associated with components of the riding floor cleaning machine; and (3) controllably communicating and/or disseminating data with at least one of another system and user.

DETAILED DESCRIPTION OF THE INVENTION

While this invention is susceptible of embodiment in many different forms, there is shown in the drawings and will be described herein in detail, one or more specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

It will be further understood that FIGS. 1-22 are merely representations and/or illustrations of riding floor cleaning machines and their associated sub-assemblies. As such, some of the components may be distorted from their actual scale for pictorial clarity and/or image enhancement.

Unless otherwise specified, the machines, sub-assemblies, components and/or parts provided herein below are commercially available from International Cleaning Equipment (ICE) (Guangdong, China) or a subsidiary thereof.

Referring now to the drawings, and to FIGS. 1-16 in particular, perspective views of riding floor cleaning machine 100 having an intelligent system are shown. Preferably, riding floor cleaning machine 100 comprises main frame sub-assembly 101 (FIG. 4), steering and drive wheel sub-assembly 102 (FIG. 5), solution tank sub-assembly 103 (FIG. 6), recovery tank sub-assembly 104 (FIG. 7), recovery tank cover sub-assembly 105 (FIG. 8), control panel sub-assembly 106 (FIG. 9), main controller sub-assembly 107 (FIG. 10), seat and detergent system sub-assembly 108 (FIG. 11), battery sub-assembly 109 (FIG. 12), scrub head sub-assembly 110 (FIG. 13), scrub head lift sub-assembly 111 (FIG. 14), squeegee sub-assembly 112 (FIG. 15), solution and detergent sub-assembly 113 (FIG. 16) and, as will be discussed in greater detail herein below, an intelligent system associated with one or more of the above-identified sub-assemblies, wherein the intelligent system selectively gathers, obtains, monitors, stores, records, and/or analyzes data associated with components of riding floor cleaning machine 100, and controllably communicates and/or disseminates such data with another system and/or user.

Figure 4:
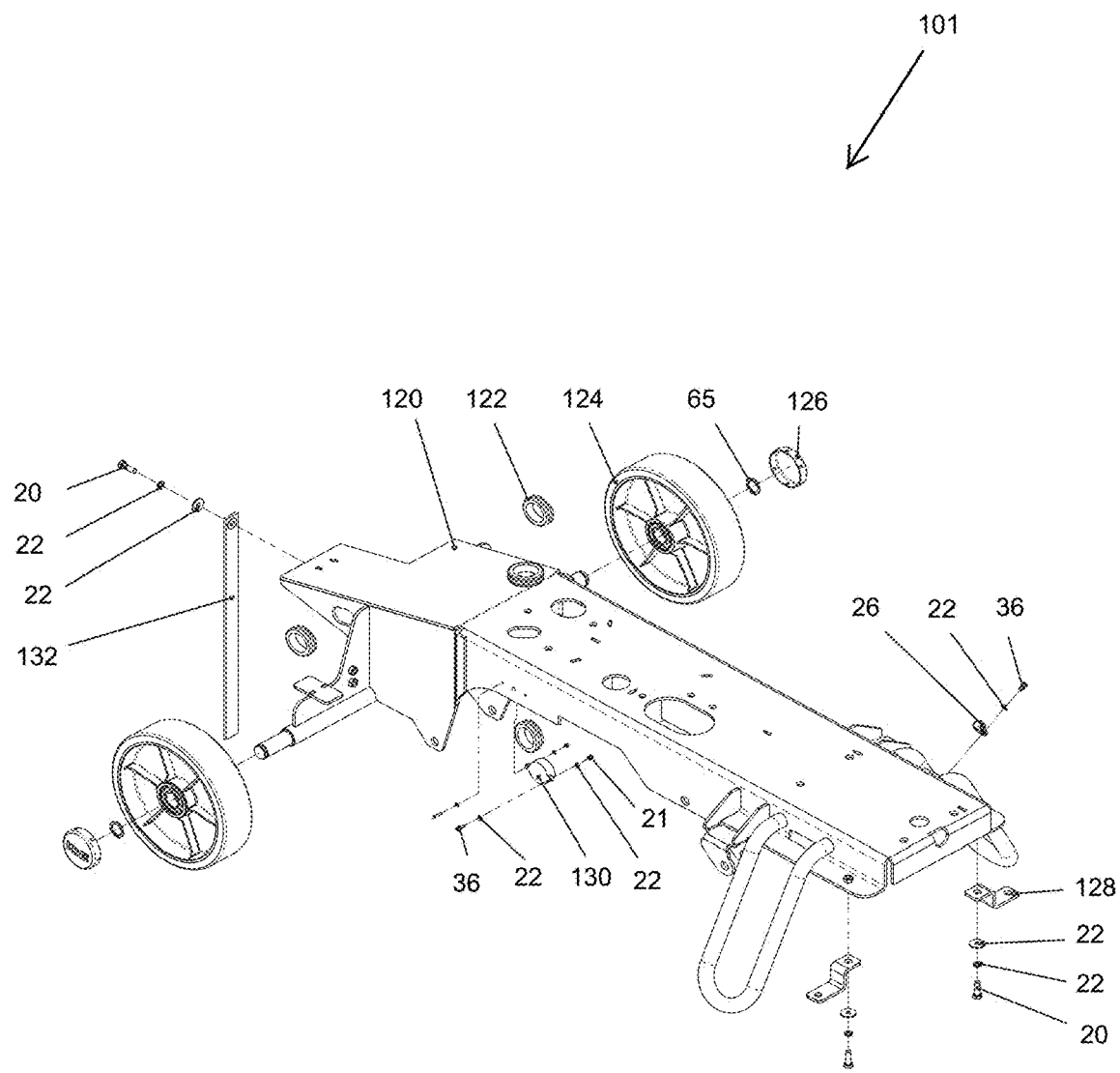
FIG. 4 of the drawings is an exploded isometric view of a main frame sub-assembly fabricated in accordance with the present invention.

Referring now to FIG. 4, in a preferred embodiment of the present invention, main frame sub-assembly 101 generally comprises welded main frame 120, rubber grommets 122, tires 124, wheel caps 126, stand brackets 128, horn 130 and static strap 132.

As is also shown in FIG. 4, main frame sub-assembly 101 utilizes a plurality of conventional bolts 20, nuts 21, washers 22, clamps 26, screws 36 and retaining rings 65 for assembly and use of main frame sub-assembly 101.

Figure 5:
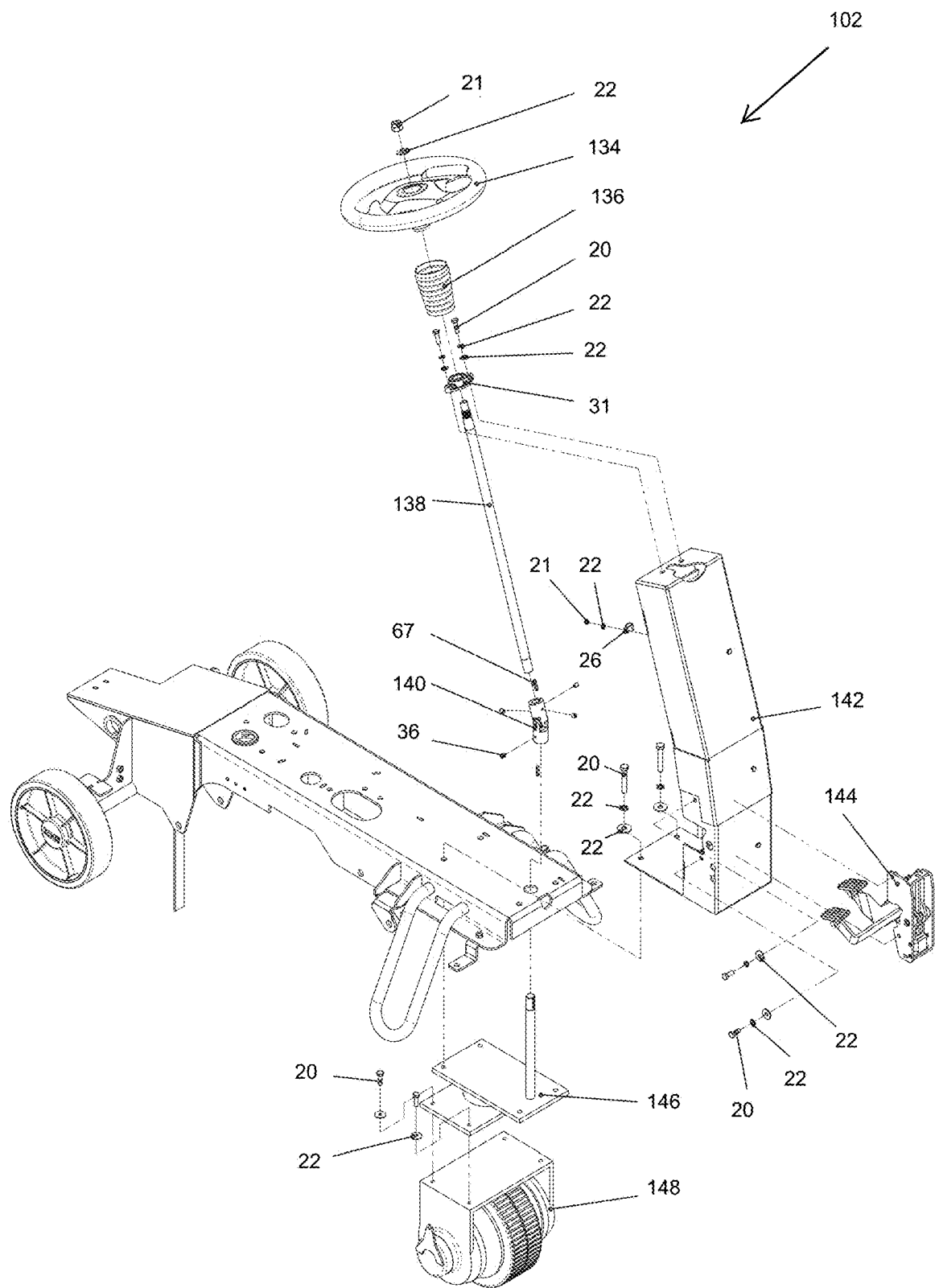
FIG. 5 of the drawings is an exploded isometric view of a steering and drive wheel sub-assembly fabricated in accordance with the present invention.

Referring now to FIG. 5, in a preferred embodiment of the present invention, steering and drive wheel sub-assembly 102 generally comprises steering wheel 134, bellows 136, steering wheel shaft 138, u-joint 140, steering support bracket 142, brake pedal accelerator 144, steer control assembly 146 and drive wheel 148.

As is also shown in FIG. 5, steering and drive wheel sub-assembly 102 utilizes a plurality of conventional bolts 20, nuts 21, washers 22, clamps 26, bearings 31, screws 36 and keys 67 for assembly and use of steering and drive wheel sub-assembly 102.

Figure 6:
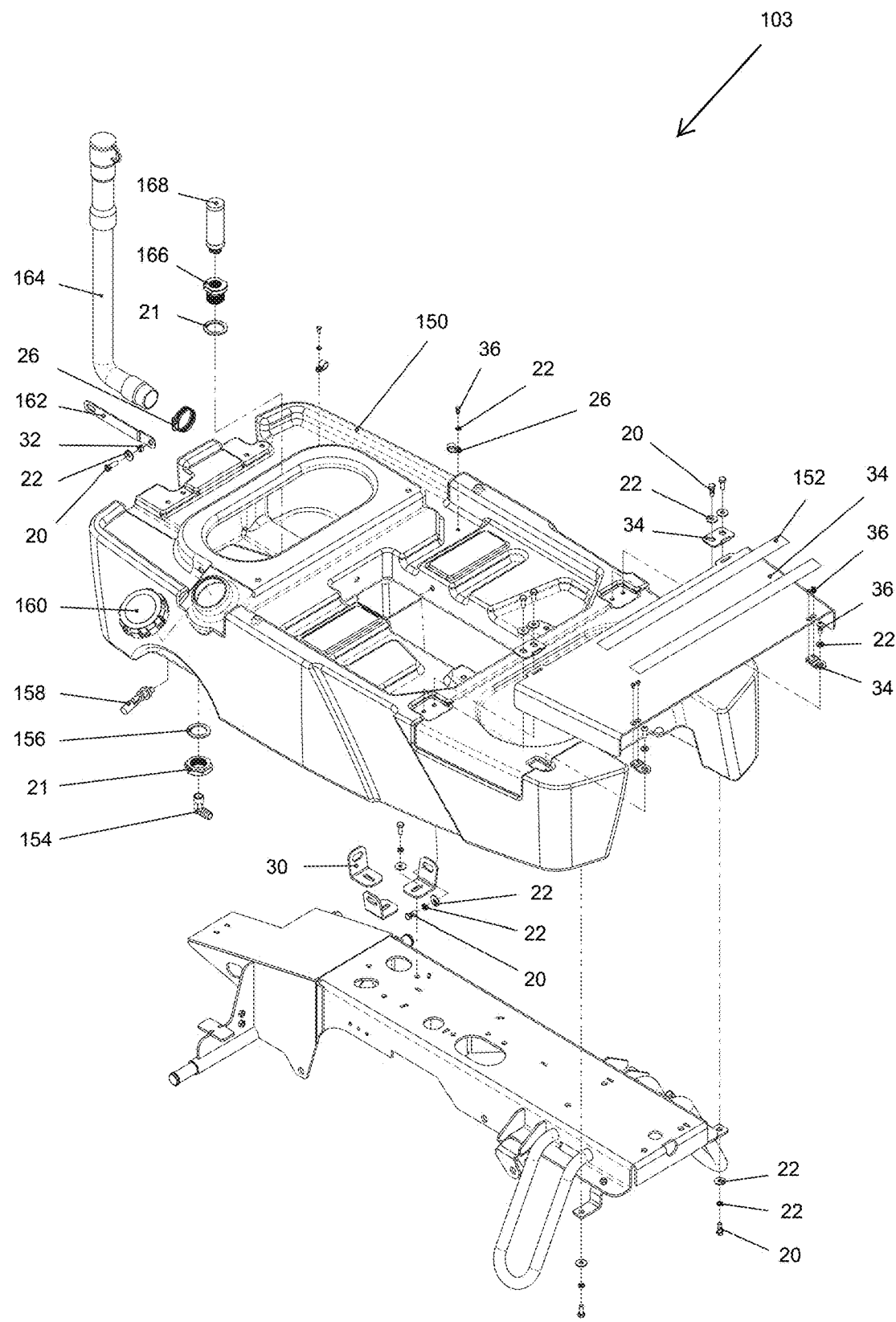
FIG. 6 of the drawings is an exploded isometric view of a solution tank sub-assembly fabricated in accordance with the present invention.

Referring now to FIG. 6, in a preferred embodiment of the present invention, solution tank sub-assembly 103 generally comprises solution tank 150, non-slip mat 152, elbow 154, sealing 156, solution level sensor 158, solution tank cap 160, recovery tank support arm 162, hose assembly 164, strainer adapter assembly 166 and strainer assembly 168.

As is also shown in FIG. 6, solution tank sub-assembly 103 utilizes a plurality of conventional bolts 20, nuts 21, washers 22, clamps 26, brackets 30, sleeves 32, plates 34 and screws 36 for assembly and use of solution tank sub-assembly 103.

Figure 7:
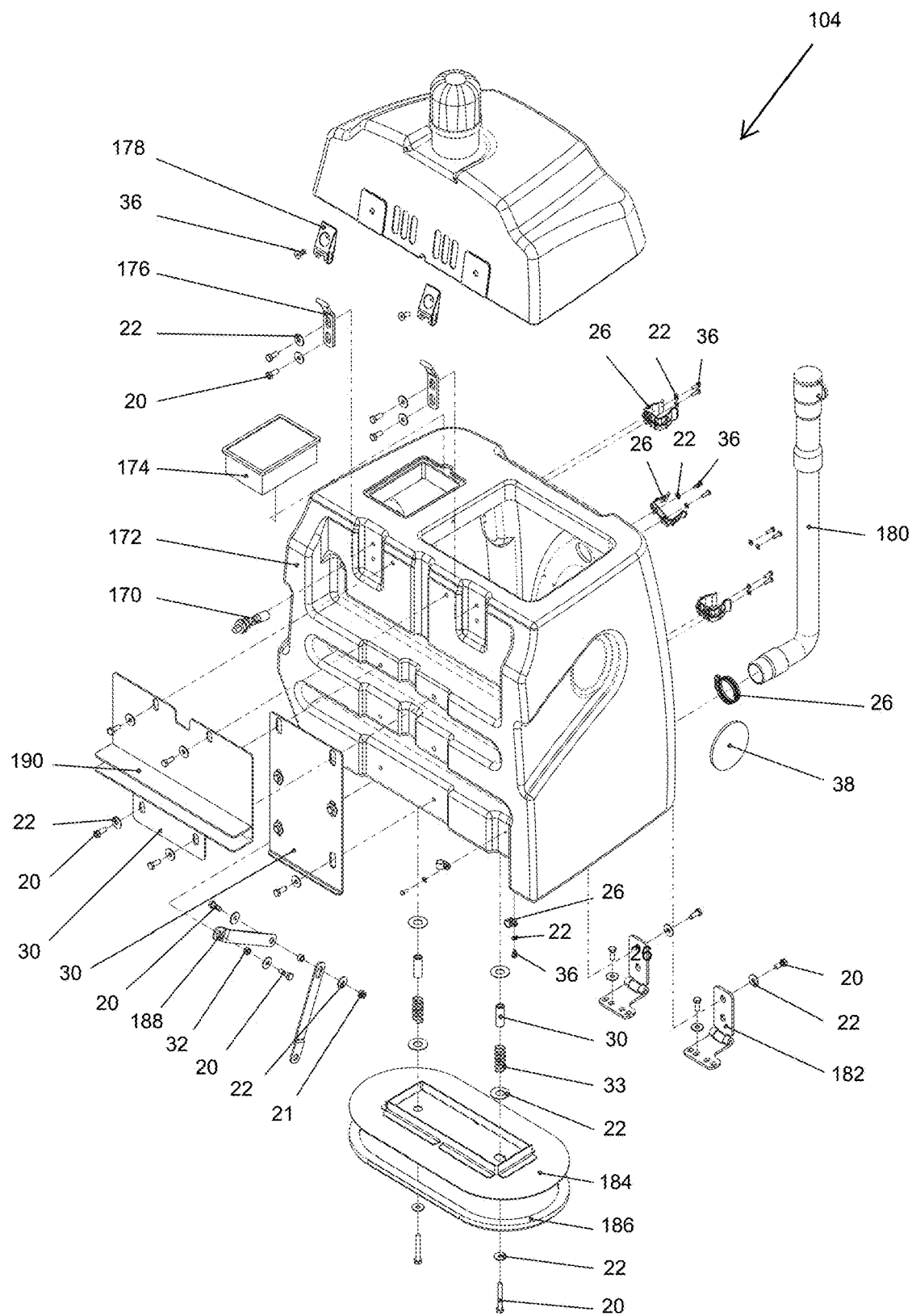
FIG. 7 of the drawings is an exploded isometric view of a recovery tank sub-assembly fabricated in accordance with the present invention.

Referring now to FIG. 7, in a preferred embodiment of the present invention, recovery tank sub-assembly 104 generally comprises solution level sensor 170, recovery tank 172, dust filter 174, welded hinge 176, leaf hinge 178, drain hose 180, hinge assembly 182, solution tank cover 184, sealing strip 186, recovery tank support arm 188 and rubber spacer 190.

As is also shown in FIG. 7, recovery tank sub-assembly 104 utilizes a plurality of conventional bolts 20, nuts 21, washers 22, clamps 26, brackets 30, sleeves 32, springs 33, screws 36, logos 38 and spacers 49 for assembly and use of recovery tank sub-assembly 104.

Figure 8:
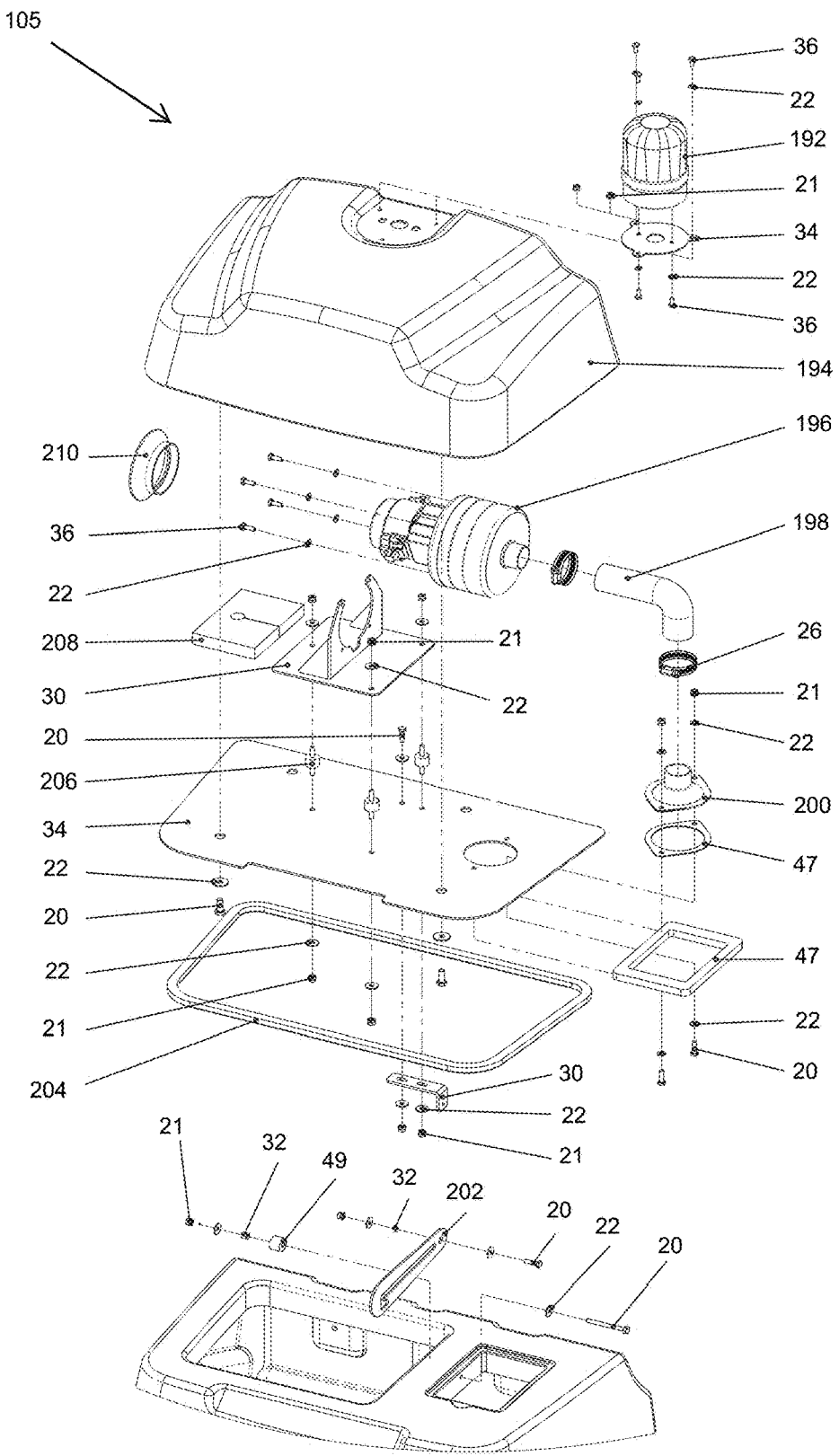
FIG. 8 of the drawings is an exploded isometric view of a recovery tank cover sub-assembly fabricated in accordance with the present invention.

Referring now to FIG. 8, in a preferred embodiment of the present invention, recovery tank cover sub-assembly 105 generally comprises caution light 192, recovery tank cover 194, vacuum motor 196, vacuum hose 198, vacuum hose adapter 200, recovery tank cover support 202, sealing strip 204, isolator 206, insulation 208 and fan seal 210.

As is also shown in FIG. 8, recovery tank cover sub-assembly 105 utilizes a plurality of conventional bolts 20, nuts 21, washers 22, clamps 26, brackets 30, sleeves 32, plates 34, screws 36, gaskets 47 and spacers 49 for assembly and use of recovery tank cover sub-assembly 105.

Figure 9:
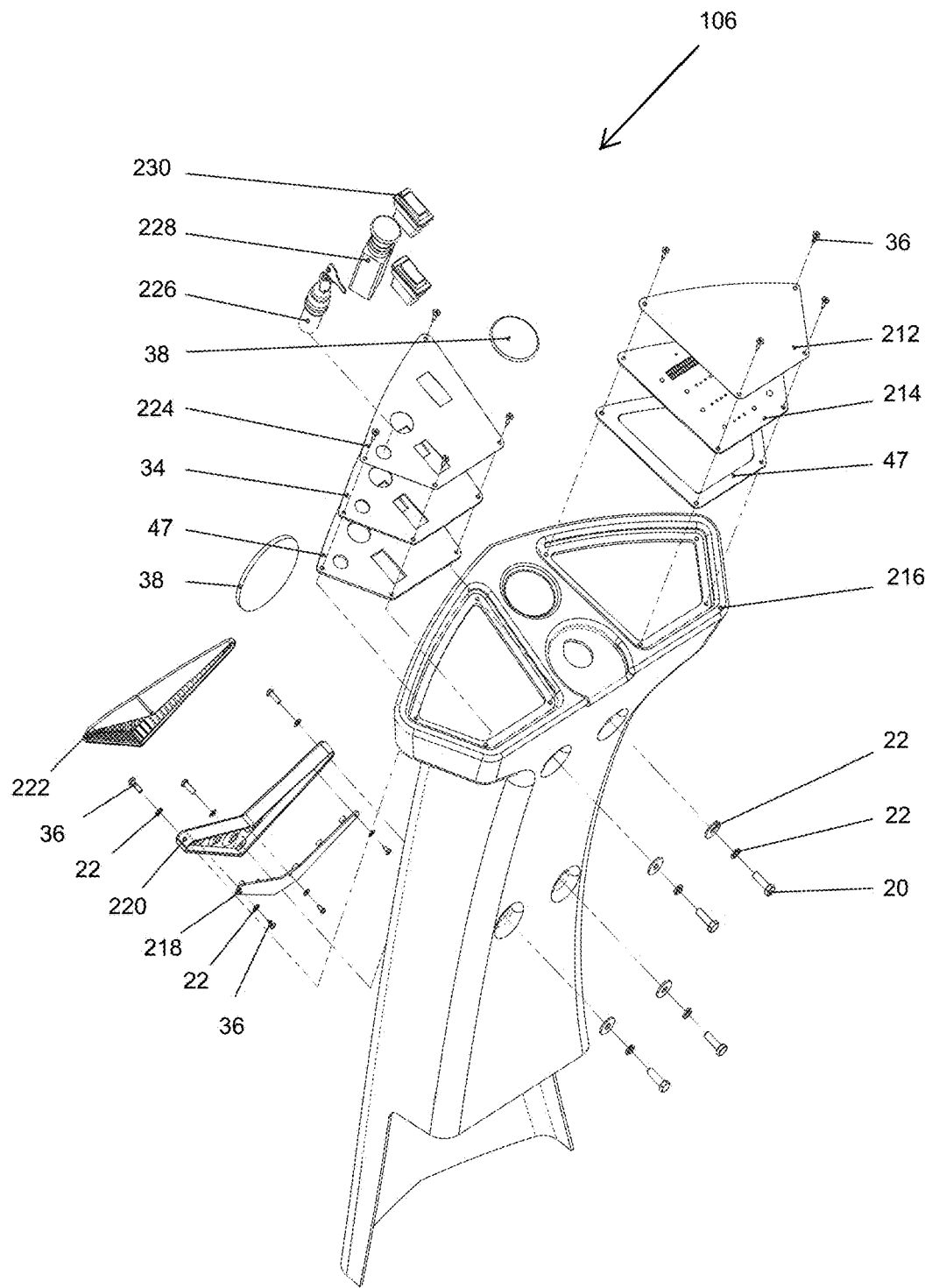
FIG. 9 of the drawings is an exploded isometric view of a control panel sub-assembly fabricated in accordance with the present invention.

Referring now to FIG. 9, in a preferred embodiment of the present invention, control panel sub-assembly 106 generally comprises control panel decal 212, control panel PCB 214, control housing 216, LED light 218, LED light base 220, LED light cover 222, switch panel decal 224, main key switch 226, emergency stop switch 228 and rocker switch 230.

As is also shown in FIG. 9, control panel sub-assembly 106 utilizes a plurality of conventional bolts 20, washers 22, plates 34, screws 36, logos 38 and gaskets 47 for assembly and use of control panel sub-assembly 106.

Figure 10:
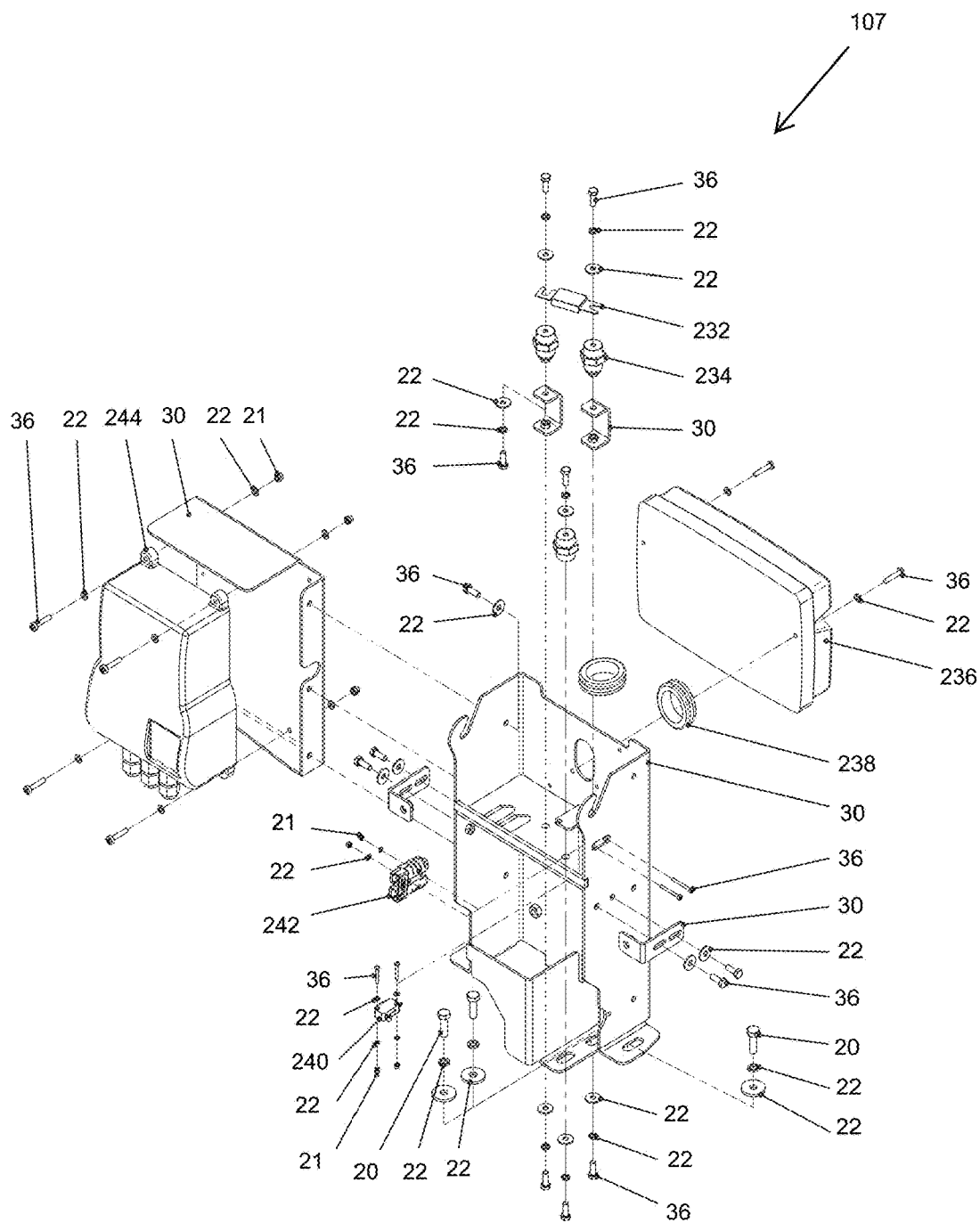
FIG. 10 of the drawings is an exploded isometric view of a main controller sub-assembly fabricated in accordance with the present invention.

Referring now to FIG. 10, in a preferred embodiment of the present invention, main controller sub-assembly 107 generally comprises fuse 232, insulator 234, main controller 236, rubber grommet 238, micro switch 240, connector 242 and on board battery charger 244.

As is also shown in FIG. 10, main controller sub-assembly 107 utilizes a plurality of conventional bolts 20, nuts 21, washers 22, brackets 30 and screws 36 for assembly and use of main controller sub-assembly 107.

Figure 11:
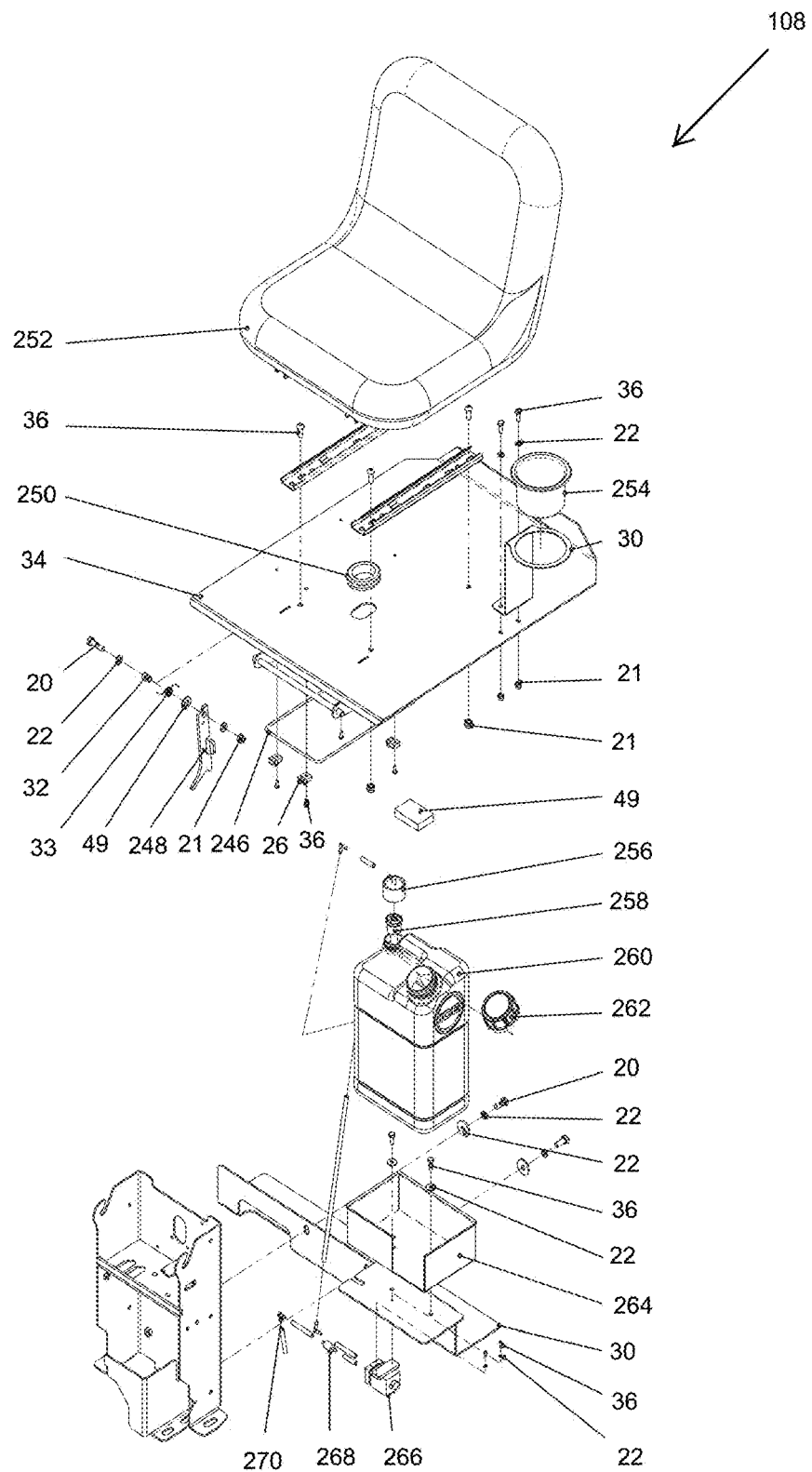
FIG. 11 of the drawings is an exploded isometric view of a seat and detergent system sub-assembly fabricated in accordance with the present invention.

Referring now to FIG. 11, in a preferred embodiment of the present invention, seat and detergent system sub-assembly 108 generally comprises cargo net 246, seat support 248, rubber grommet 250, seat 252, cup holder 254, key adaptor 256, lock insert 258, detergent bottle 260, bottle cap 262, detergent bottle box 264, pump 266, one way valve 268 and fitting 270.

As is also shown in FIG. 11, seat and detergent system sub-assembly 108 utilizes a plurality of conventional bolts 20, nuts 21, washers 22, clamps 26, brackets 30, sleeves 32, springs 33, plates 34, screws 36 and spacers 49 for assembly and use of seat and detergent system sub-assembly 108.

Figure 12:
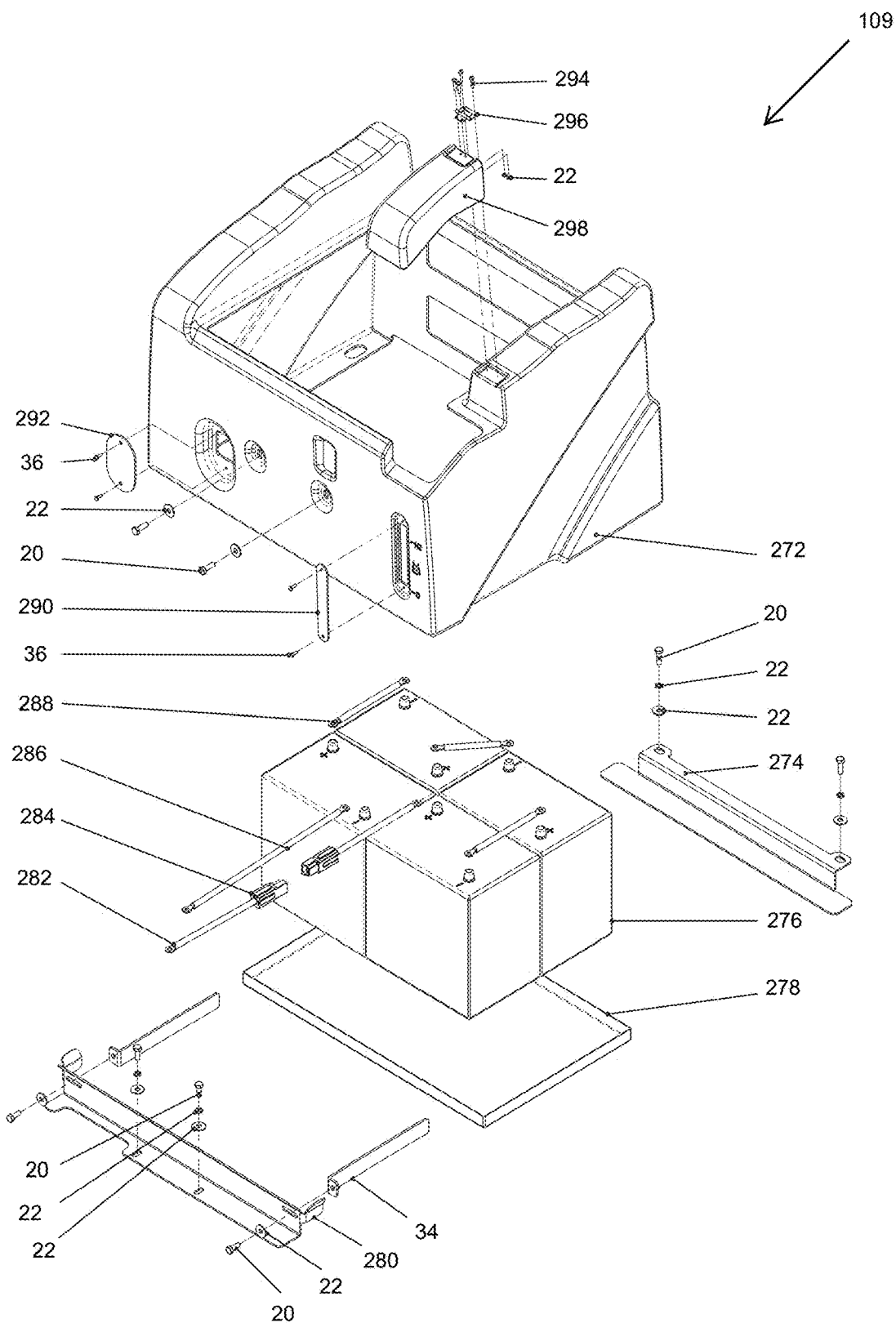
FIG. 12 of the drawings is an exploded isometric view of a battery sub-assembly fabricated in accordance with the present invention.

Referring now to FIG. 12, in a preferred embodiment of the present invention, battery sub-assembly 109 generally comprises battery box 272, rear battery support 274, battery 276, battery tray 278, front battery support 280, red battery connect cable 282, connector 284, first black battery connect cable 286, second black battery connect cable 288, first cover 290, second cover 292, rivet 294, hinge assembly 296 and third cover 298.

As is also shown in FIG. 12, battery sub-assembly 109 utilizes a plurality of conventional bolts 20, washers 22, plates 34 and screws 36 for assembly and use of battery sub-assembly 109.

In accordance with the present invention, battery 276 preferably comprises a secondary electrochemical cell, such as a lead acid, NiCad, NiMH, and/or lithium-ion battery. Preferred examples of lithium-ion batteries include lithium cobalt oxide ($LiCoO_2$) batteries, lithium manganese oxide ($LiMn_2O_4$) batteries, lithium nickel manganese cobalt oxide ($LiNiMnCoO_2$) batteries, lithium iron phosphate (LiFePO) batteries, lithium nickel cobalt aluminum oxide ($LiNiCoAlO_2$) batteries, and lithium titanate ($Li_4Ti_5O_{12}$) batteries. In one embodiment each battery 276 comprises an anode, a cathode, and an electrolyte, wherein at least one of the anode, cathode, and electrolyte are monitored by the intelligent system of the riding floor cleaning machine's intelligent system. Such monitoring comprises evaluating the structural integrity of the anode, the cathode, and/or the electrolyte, and/or the cycle life of each component—including electrolyte level.

Figure 13:
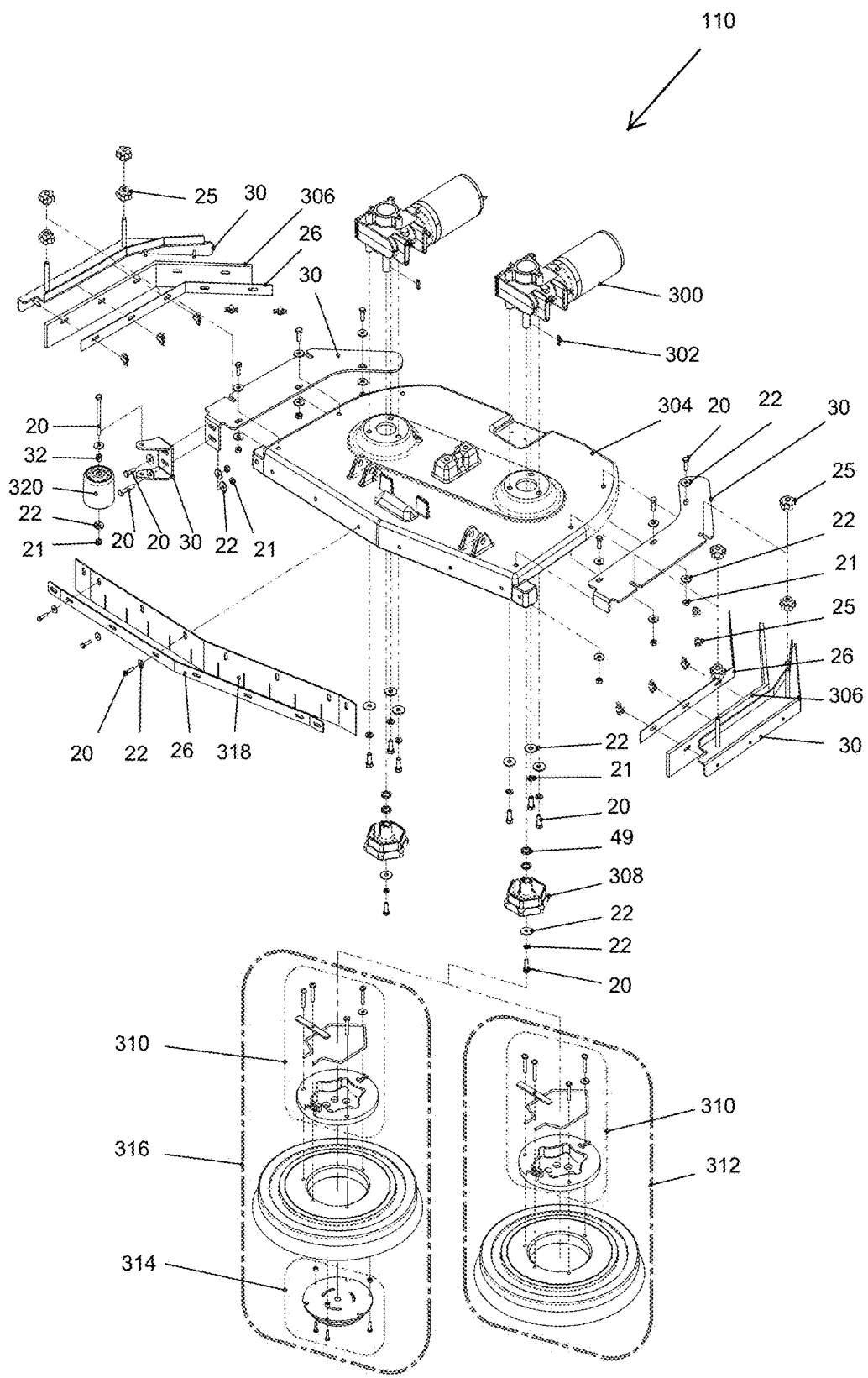
FIG. 13 of the drawings is an exploded isometric view of a scrub head sub-assembly fabricated in accordance with the present invention.

Referring now to FIG. 13, in a preferred embodiment of the present invention, scrub head sub-assembly 110 generally comprises brush motors 300, keys 302, scrub head housing 304, side skirt blades 306, brush drive hubs 308, clutches 310, brushes 312, center locks 314, pad drivers 316, skirt 318 and protective wheel 320.

As is also shown in FIG. 13, scrub head sub-assembly 110 utilizes a plurality of conventional bolts 20, nuts 21, washers 22, knobs 25, clamps 26, brackets 30, sleeves 32 and spacers 49 for assembly and use of scrub head sub-assembly 110.

Figure 14:
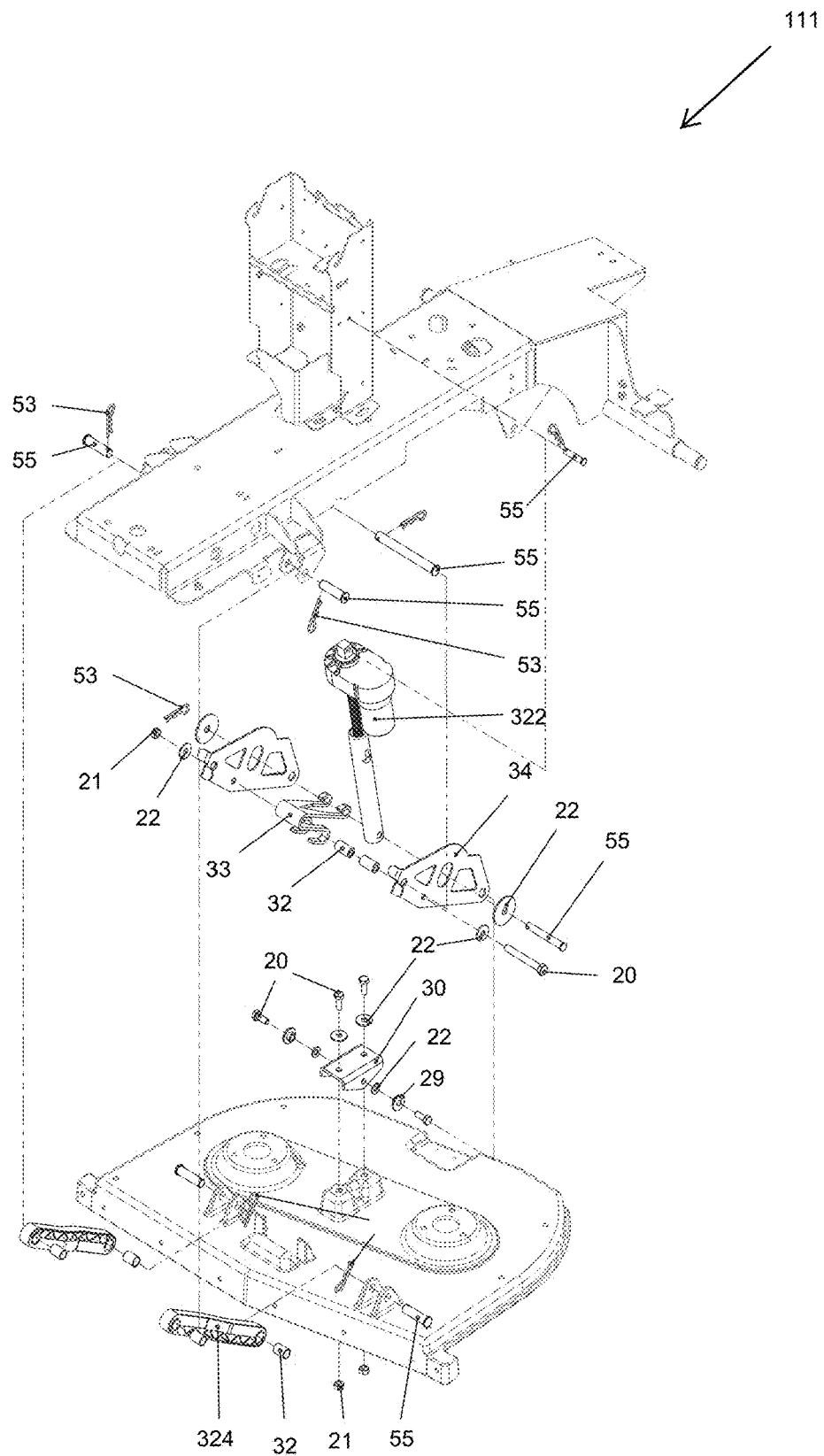
FIG. 14 of the drawings is an exploded isometric view of a scrub head lift sub-assembly fabricated in accordance with the present invention.

Referring now to FIG. 14, in a preferred embodiment of the present invention, scrub head lift sub-assembly 111 generally comprises linear actuator 322 and scrub head lifting arm 324.

As is also shown in FIG. 14, scrub head lift sub-assembly 111 utilizes a plurality of conventional bolts 20, nuts 21, washers 22, bushings 29, brackets 30, sleeves 32, springs 33, plates 34, cotters 53 and pins 55 for assembly and use of scrub head lift sub-assembly 111.

Figure 15:
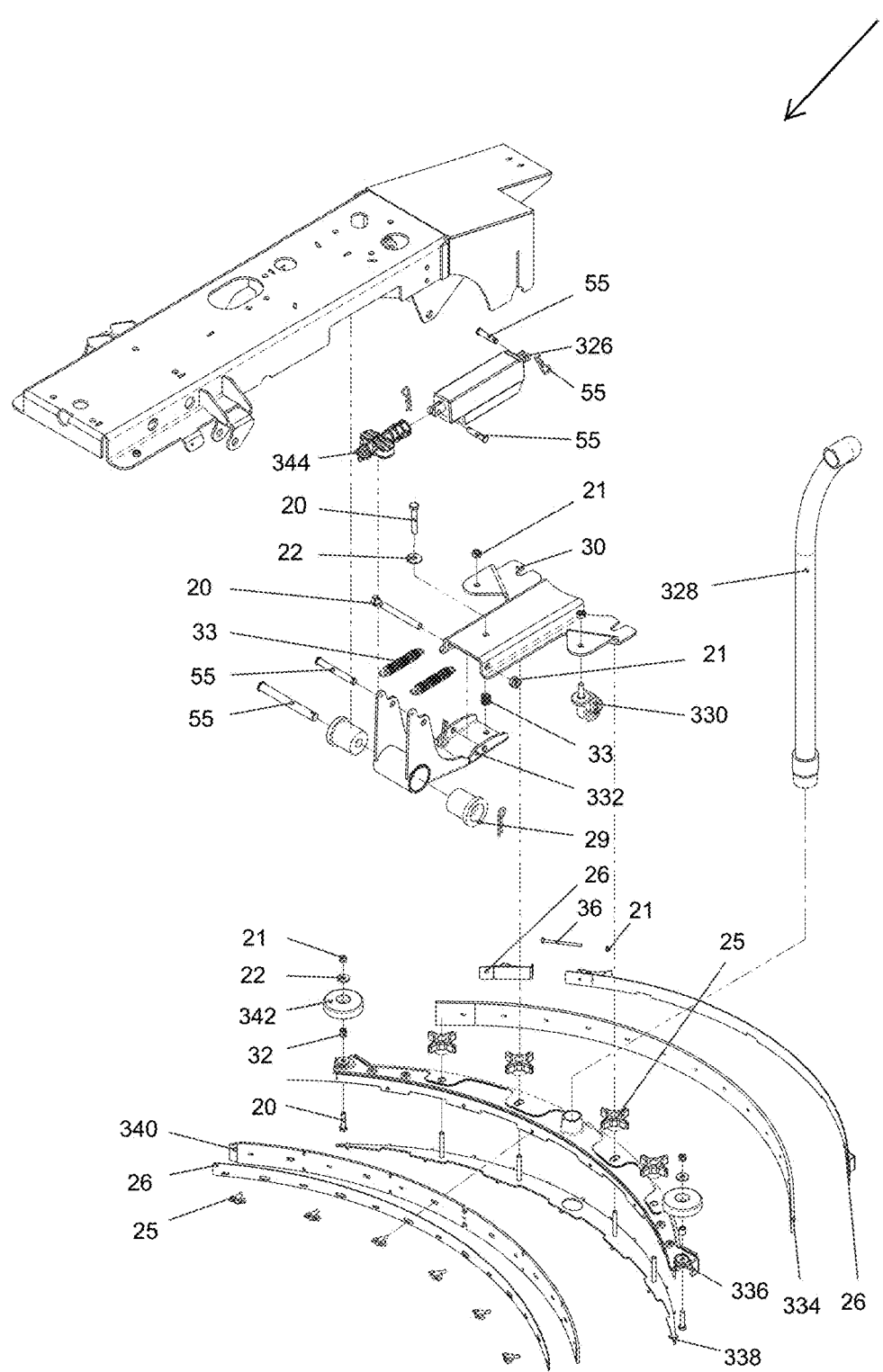
FIG. 15 of the drawings is an exploded isometric view of a squeegee sub-assembly fabricated in accordance with the present invention.

Referring now to FIG. 15, in a preferred embodiment of the present invention, squeegee sub-assembly 112 generally comprises linear actuator 326, vacuum hose 328, caster 330, squeegee lifting arm 332, rear blade 334, squeegee hosing 336, squeegee retainer 338, front blade 340, protective wheels 342 and adapter 344.

As is also shown in FIG. 15, squeegee sub-assembly 112 utilizes a plurality of conventional bolts 20, nuts 21, washers 22, knobs 25, clamps 26, bushings 29, brackets 30, sleeves 32, springs 33, screws 36 and pins 55 for assembly and use of squeegee sub-assembly 112.

Figure 16:
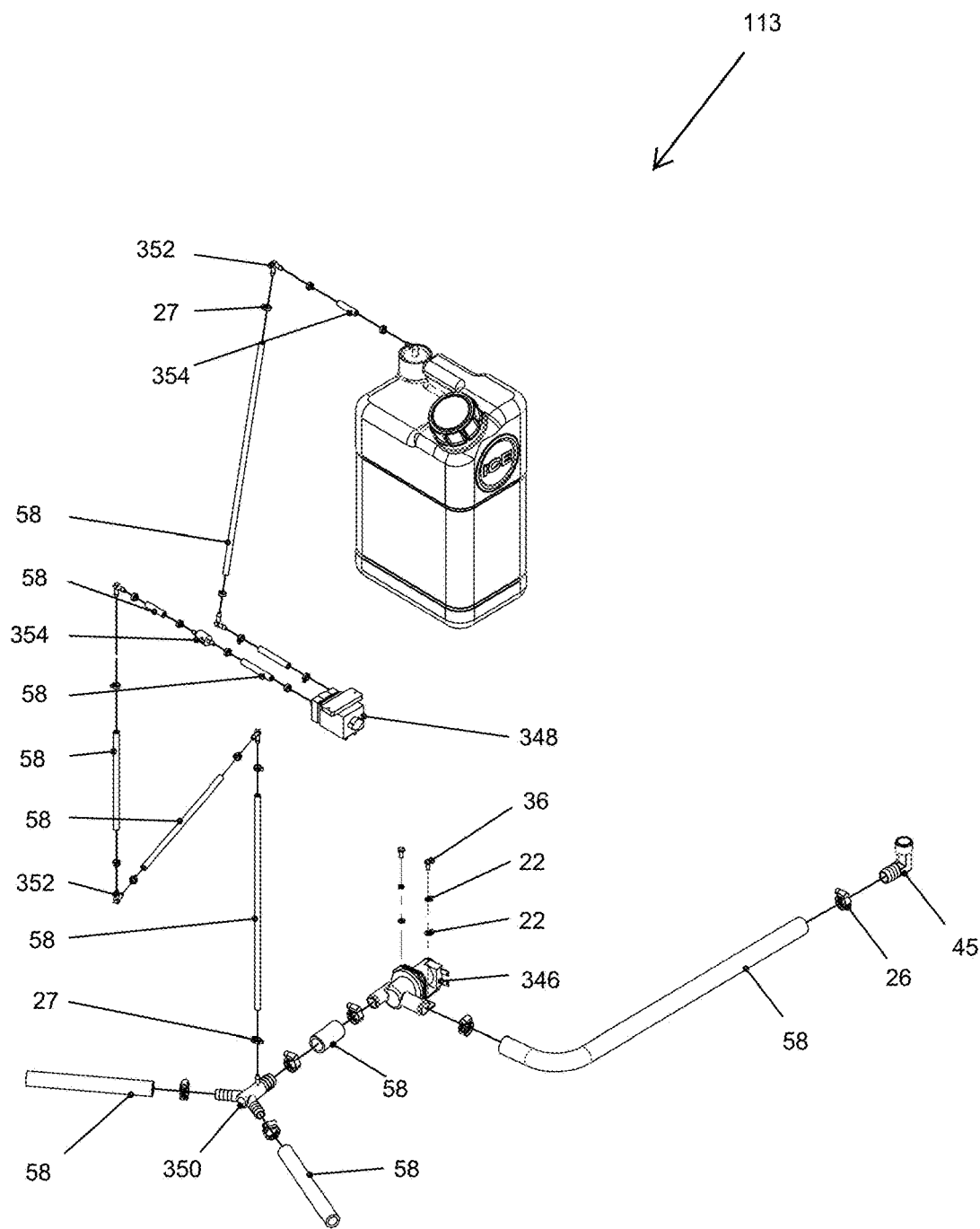
FIG. 16 of the drawings is an exploded isometric view of a solution and detergent sub-assembly fabricated in accordance with the present invention.

Referring now to FIG. 16, in a preferred embodiment of the present invention, solution and detergent sub-assembly 113 generally comprises solenoid valve 346, pump 348, plastic fitting 350, fitting 352, and one way valve 354.

As is also shown in FIG. 16, solution and detergent sub-assembly 113 utilizes a plurality of conventional washers 22, clamps 26, ties 27, screws 36, elbows 45 and tubing 58 for assembly and use of solution and detergent sub-assembly 113.

Referring now to FIG. 17, a wiring diagram for riding floor cleaning machine 100 is provided.

In another embodiment of the present invention, a sub-assembly having an intelligent system for a riding floor cleaning machine is provided and generally comprises a primary and/or secondary electrochemical cell, and an intelligent system, wherein the intelligent system at least one of selectively gathers, obtains, monitors, stores, records, and analyzes data associated with components of the riding floor cleaning machine, and at least one of controllably communicates and disseminates such data with at least one of another system and user.

In accordance with the present invention, a method for using an intelligent system with a riding floor cleaning machine is provided and generally, comprises the following steps: (1) providing a riding floor cleaning machine having an intelligent system; (2) selectively gathering, obtaining, monitoring, storing, recording, and/or analyzing data associated with components of the riding floor cleaning machine; and (3) controllably communicating and/or disseminating data with at least one of another system and user. In particular and as is collectively shown in FIGS. 1-22, an intelligent system enables a riding floor cleaning machine to transmit data obtained from the riding floor cleaning machine assembly to, for example, a storage or data server, which, in turn, transmits selected data to, for example, an end user via email and/or text messaging.

Figure 18:
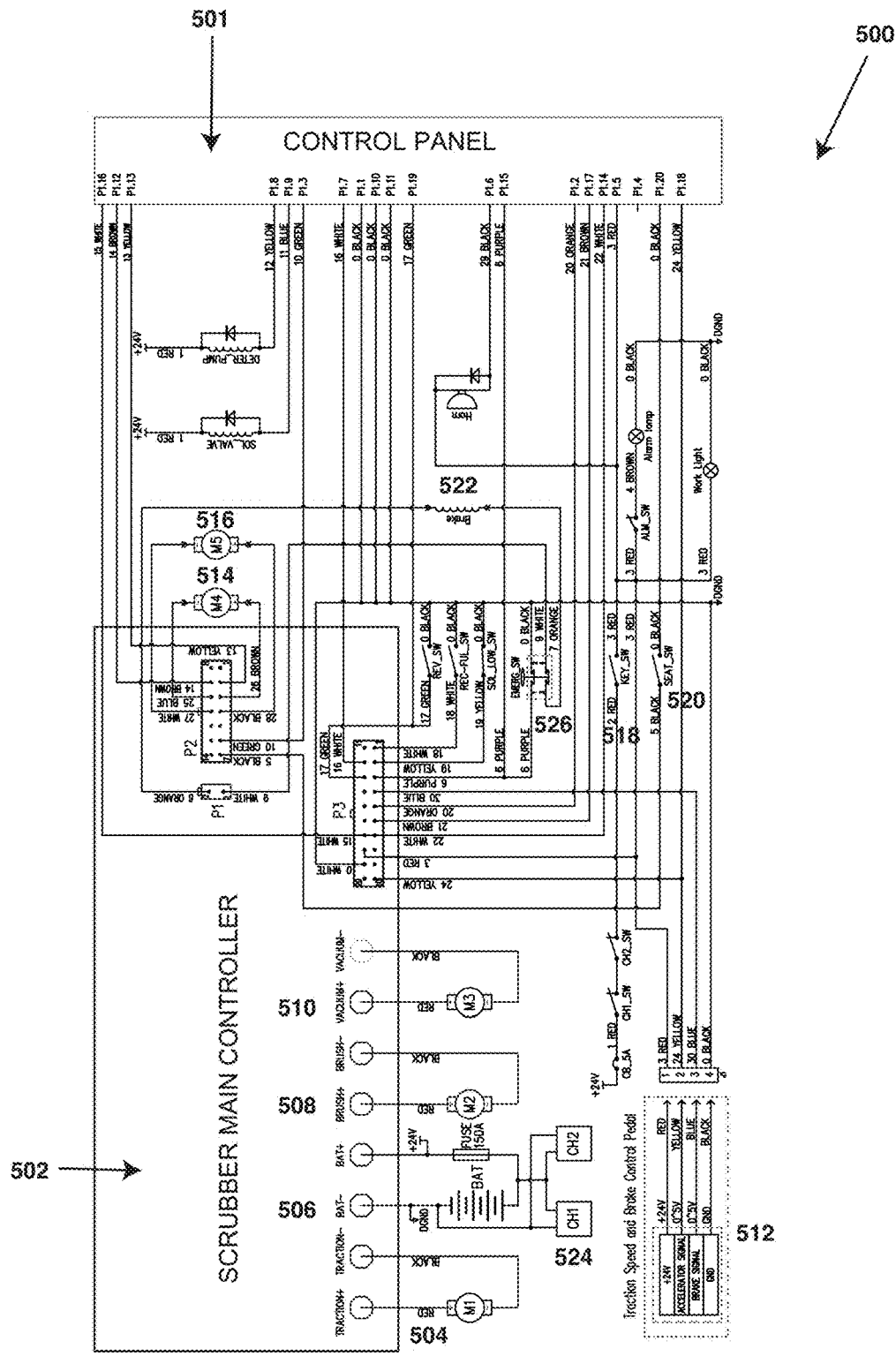
FIG. 18 of the drawings is a schematic of a circuit diagram of a riding floor cleaning machine fabricated in accordance with the present invention.

FIG. 18 is a schematic diagram of an example circuit diagram 500 of a riding floor cleaning machine assembly of the present technology. Generally, the circuit diagram 500 includes a control panel 501 that provides a user interface for controlling various components and features of the machine assembly, a PCB (scrubber main controller) 502, which in turn includes a traction motor interface 504, a battery interface 506, a brush motor interface 508, a vacuum motor interface 510. The circuit 500 also comprises a traction speed and break controller 512, a scrub head lifting actuator 514, a squeegee head lifting actuator 516, a power key switch 518, a seat switch 520, a brake coil 522, one or more charger interfaces 524, and an emergency switch 526.

The PCB 502 (e.g., controller) functions as a main controller board for controlling and communicating with various components of the riding floor cleaning machine assembly. Users utilize the control panel 501 to interact with and control the various features of the assembly such as the brush and squeegee. In some embodiments, the PCB 502 can include one or more features of an example computing machine illustrated and described with respect to FIG. 22. The PCB 502 includes at least a processor and a memory for storing executable instructions. The processor can execute the instructions to provide any of the data sensing, gathering, processing, transforming, and/or communication features described herein. In yet other embodiments, an intelligent system can include the PCB 502 that is configured to remotely activate/deactivate (e.g., turn on and off) riding floor cleaning machine 100 via, for example, power key switch 518 or other circuit implementation.

It will be understood that the PCB 502 can be referred to generally as an intelligent system or component that is configured to provide data gathering, recording, logging, transmitting, and analysis functionalities. In other embodiments, an intelligent system can include the PCB 502 that cooperates with a management server, where the PCB 502 gathers and collects operational data for the riding floor cleaning machine assembly and the management server performs data analysis functionalities on the operational data.

Generally the PCB 502 is communicatively coupled to each of the other components of the circuit described above, either directly or indirectly. For example, the PCB 502 directly communicates with the batteries of the riding floor cleaning machine assembly, through the battery interface 506, while the PCB 502 indirectly couples with the traction speed and control pedal through the traction speed and control pedal controller 512.

The traction motor interface 504 allows the PCB 502 to communicate with a traction motor that drives the riding floor cleaning machine assembly. The PCB 502 can also collect information about the operational characteristics of the traction motor through the traction motor interface 504. The battery interface 506 allows for the PCB 502 to communicate with the Ion batteries to receive feedback including charge level, average usage and current draw, as well as other battery related metrics.

The one or more charger interfaces 524 allows the PCB 502 to determine charging metrics such as average charging times for the battery of the assembly.

The main power key switch 518 is controlled by the PCB 502 to allow the riding floor cleaning machine assembly to be turned on and off. Key metrics around the main power key switch 518 can include start and stop times. The PCB 502 can time stamp each operation such as device on and device off instances and record these metrics for statistical or reporting purposes. Other statistics could include time duration between device on and device off operations, which indicate duration of usage for the riding floor cleaning machine assembly.

A seat switch 520 is controlled by the PCB 502 to provide various seat configurations and/or seat safety features, such as engagement or disengagement of the motors when the seat of the assembly is unoccupied.

The brush motor interface 508 can be controlled by the PCB 502 to selectively control engagement or disengagement of the brush motor of the riding floor cleaning machine assembly. The PCB 502 can track brush motor usage time by measuring engagement and disengagement of the brush motor. These statistics can be compared against device on and device off periods to determine how long the brush is engaged compared to the overall time frame of device on periods. By way of example, the PCB 502 can measure that the device is in a device on state for two hours, but the brush motor was only in use for 15 minutes.

The vacuum motor interface 510 can be utilized by the PCB 502 to control operation of the vacuum motor 44 of the riding floor cleaning machine assembly.

The emergency control switch 526 is controlled by the PCB 502 to control operation of an emergency switch of the riding floor cleaning machine assembly. A user can stop operation of the riding floor cleaning machine assembly by actuating the emergency switch. Actuation of the emergency switch is sensed by the PCB 502, causing the PCB 502 to selectively stop the brush motor 300 and vacuum motor 44.

In one embodiment, the emergency control switch 526 can be used to selectively disrupt power provided to the traction motor through the traction motor interface 504.

The PCB 502 can also control the brush motor 184 and vacuum motor 44, through their respective interfaces, such as brush motor interface 508 and vacuum motor interface 510. As with other components, the PCB 502 can be configured to sense and collect operational details of these devices.

The scrub head lifting actuator 514 and the squeegee lifting actuator 516 are also controlled by the PCB 502 in response to user commands received at the control panel 501 to raise the scrub head or squeegee, respectively. The PCB 502 can also control the scrub head and/or squeegee in response to other system feedback such as activation of the emergency stop switch 526. For example, if the emergency stop switch 526 is engaged, the PCB 502 can automatically engage the scrub head or squeegee to lift using the scrub head lifting actuator 514 and the squeegee lifting actuator 516.

The break coil 522 can be coupled to the emergency stop switch 526. If the emergency stop switch 526 is engaged, the break coil 522 is activated to bring the assembly to a stop.

The traction speed and brake control pedal controller 512 is configured to receive signals from a traction speed and brake control pedal to selectively cause the assembly to translate at various speeds through movement of the traction speed and brake control pedal. The PCB 502 can receive signals from the traction speed and brake control pedal controller 512 so as to track and monitor the movement and translation of the assembly.

Figure 19:
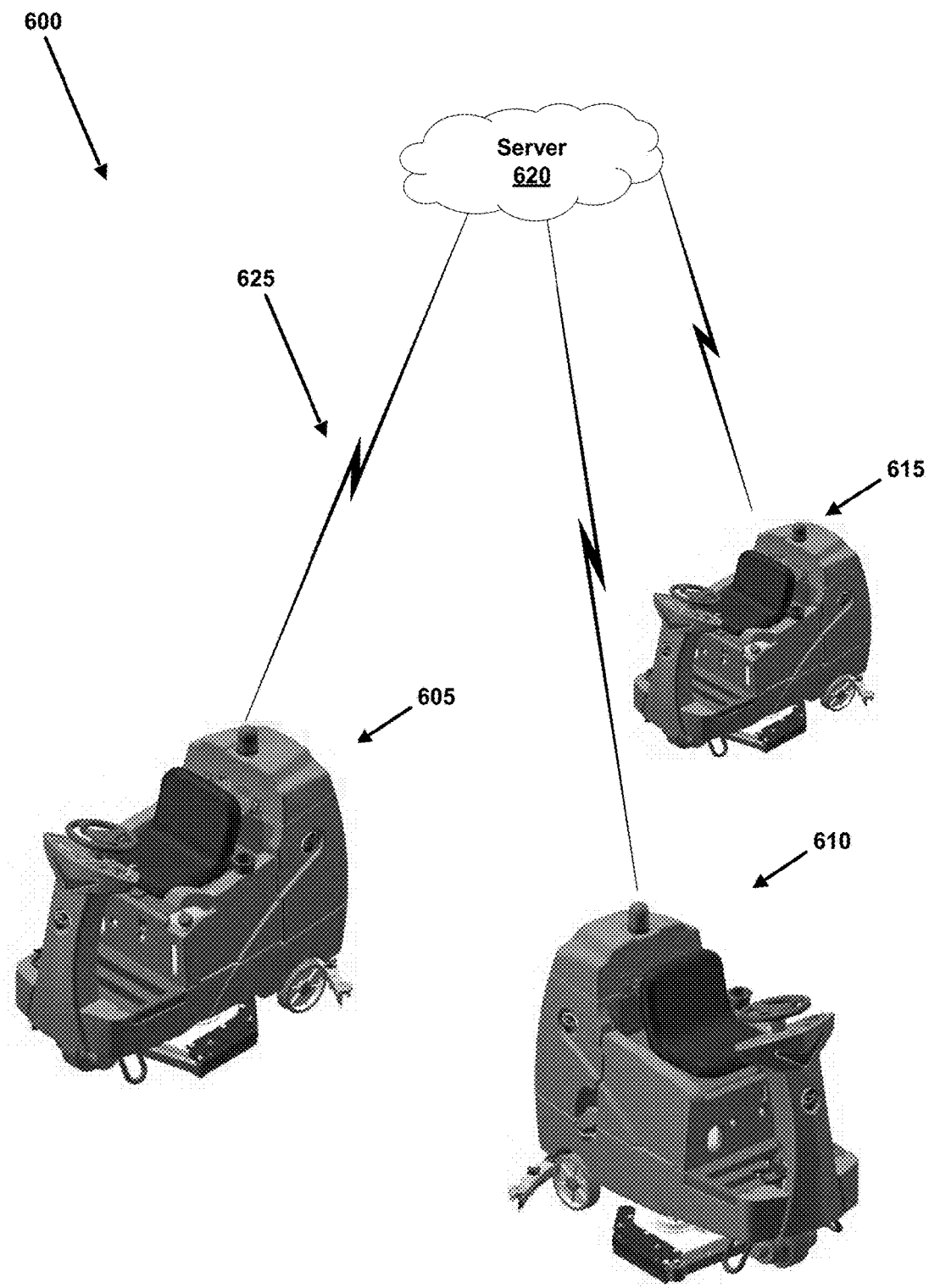
FIG. 19 of the drawings is an illustrative example of a network system of riding floor cleaning machines.

In some embodiments, the PCB 502 communicates within an intelligent system 600, illustrated in greater detail in FIG. 19. The PCB 502 can include any wired or wireless means of communication such as a wireless communications interface. The wireless communications interface can utilize any protocol for network communication including short range protocols such as Bluetooth, near field communications (NFC), infra-red, and so forth. The wireless communications interface can also include utilize Wi-Fi, a cellular network, or other similar networks using other protocols.

FIG. 19 illustrates an example network system of devices. The networked system 600 comprises a plurality of devices 605, 610, and 615, which can all communicatively couple with a management server 620 over a network 625.

Each of the plurality of devices 605-615 can be collocated in the same facility, such as a building, factory, school, or other location. In other embodiments, one or more (or all) plurality of devices 605-615 can be remotely located from one another.

Each of the plurality of devices 605-615 can gather and report its operational metrics to the management server 620 over the network 625, as will be discussed in greater detail below.

Exemplary networks, such as network 625 may include any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including 4GLTE (Long Term Evolution), 3GPP (3G Radio Access Network), WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 620 can further include or interface with any one or more of an RS-232 serial connection, an IEEE-1394 (Fire wire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

The management server 620 is preferably implemented in a cloud-computing environment. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources. The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

In operation, each of the plurality of devices 605-615 can communicate with the management server 620, with each of the plurality of devices 605-615 acting as a node within the network. The management server 620 can track metrics about each of the plurality of devices 605-615 by communicating with the PCB on each of the plurality of devices 605-615.

In some embodiments, data obtained by the PCB of each of the plurality of devices 605-615 is selectively gathered, obtained, monitored, stored, recorded, and/or analyzed by the management system 620.

According to some embodiments, data that is selectively gathered, obtained, monitored, stored, recorded, and/or analyzed, preferably comprises, for example, working time, current, voltage, power, and so forth from, for example, the vacuum motor, lithium-ion battery, traction motor, brush motor, and other components of the riding floor cleaning machine. This data or information is preferably received at the PCB 502 (FIG. 18) which may be associated with the lithium-ion battery positioned in the riding floor cleaning machine 100. That is, the PCB 502 controls the operations of each of the components of the device. As described above, the operational data for each of these components can be captured and logged by the PCB 502 and stored in memory on the PCB 502. In other embodiments, operational data can be stored in memory on the PCB 502 and transmitted asynchronously in batches (according to memory size) to the management server 620. In some embodiments, the operational data can be streamed from the PCB 502 to the management server 620 synchronously.

Each device can be managed by assignment of a device ID by the management system. The device ID can be an assigned number, a SIM card number, an IMEI, a MAC address, an IP address, or other similar unique identifier. The device ID can be appended to each communication transmitted by the PCB 502 to the management server 620.

Stored data or information is preferably analyzed by the management server 620 for parameter compliance, and if, necessary such data or information is then communicated to, for example, an end user, servicing personal, and/or owner. For example, the owner of a riding floor cleaning machine assembly can set a threshold of hours of operation for the device that are required per week. If the riding floor cleaning machine assembly is not operated for a period of time that meets or exceeds this threshold, the riding floor cleaning machine assembly is identified by the management system 620.

The transfer of data with regard to each individual machine will help end users better plan for number of machines and employees at each individual work site. Companies with sizeable cleaning staff, (e.g., contact cleaning companies) will find it relevant and useful.

In one embodiment the data or information with regard to usage of each individual machine is collected and transmitted daily at a specific time to, for example, the management server. This will allow end users, as well as, distributors and dealers to access the information that they need, so as to monitor usage of these machines and allow them to extract maximum efficiency during operations. In another embodiment of the present invention, other than information for individual days, cumulative totals and averages are readily available too, and the information is preferably updated through the lifespan of the riding floor cleaning machine assembly. Examples of data or information uploaded on a daily basis include, for example, the number of hours and specific time the machine was in operation during the previous 24 hours, the monthly total hours for machine usage, and the total hours of machine usage. Furthermore, the present invention enables recording and analysis of an accumulation total for working parts like batteries, vacuum motors, drive/traction motors and brush motors. Since each component has a lifespan, it will help distributors, dealers, and owners selectively monitor the exact time when these components (e.g., vacuum motor, brush motor and batteries) need to be changed instead of waiting for them to break down, which will affect the working efficiency of the end users. Another important advantage of having this data or information transfer is that in the event the machine breaks down, (e.g., the vacuum motor, brush motor, etcetera stops working), what has broken down will be selectively transmitted to the appropriate servicing personnel by email and/or cell phone text messaging that is/are responsible for the repairs and maintenance of the machines, management of the end user, and so forth.

Figure 20:
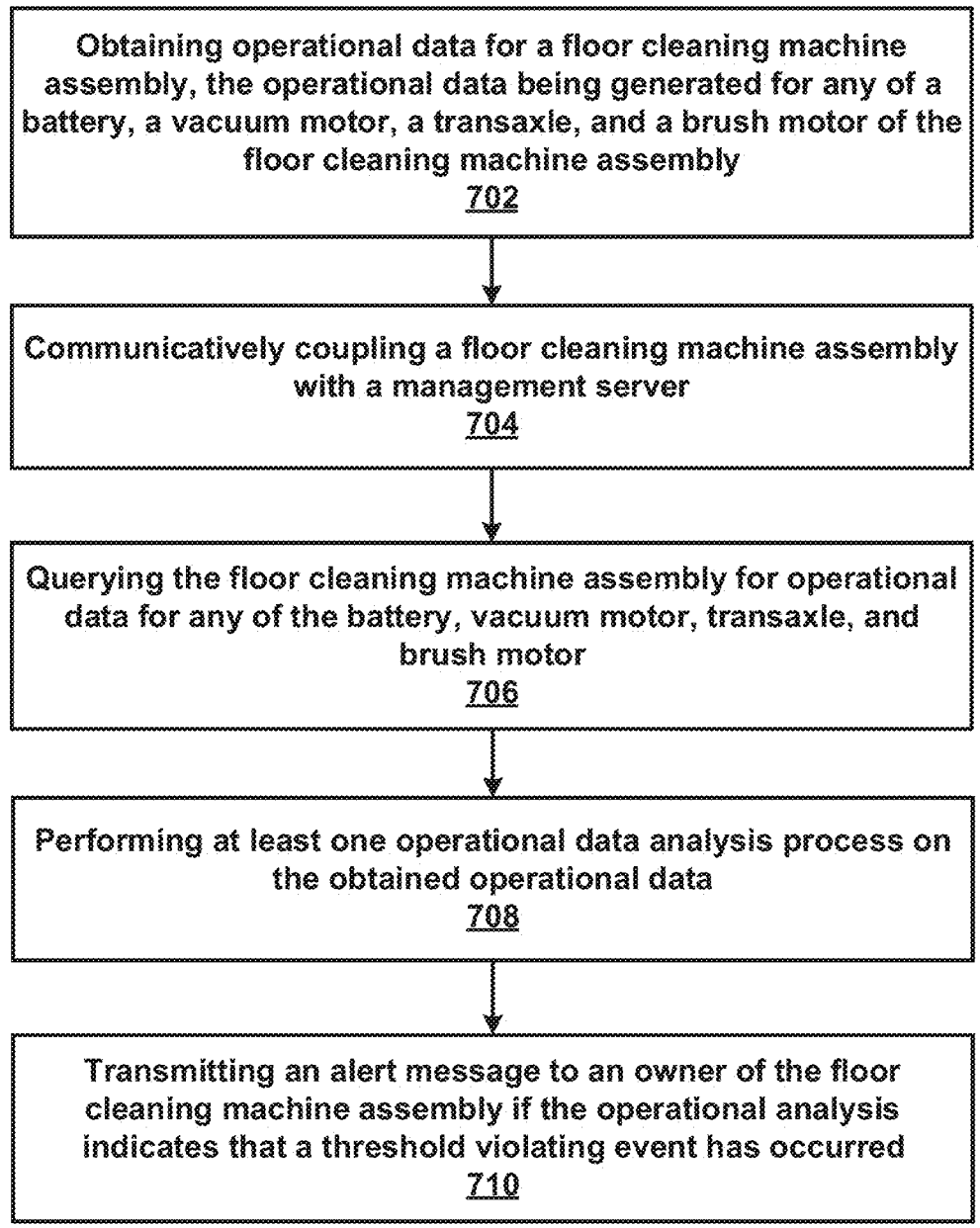
FIG. 20 of the drawings is a flow chart of a method in accordance with the present invention.

FIG. 20 is a flowchart of an example method of the present technology. The method includes obtaining 702 operational data for a riding floor cleaning machine assembly, the operational data being generated for any of a battery, a vacuum motor, a drive/traction motor, and a brush motor of the riding floor cleaning machine assembly.

As mentioned above, this operational data can be gathered by a PCB (such as PCB 502 of FIG. 18) during operation of the riding floor cleaning machine assembly.

The method also comprises communicatively coupling 704 a riding floor cleaning machine assembly with a management server. As mentioned above, this could comprise a wireless communication module of the PCB 502 coupling with the management server over a network connection.

Once the riding floor cleaning machine assembly and the management server are communicatively coupled with one another, the method can further comprise the management server querying 706 the riding floor cleaning machine assembly for operational data for any of the battery, vacuum motor, traction motor, and brush motor. For example, the management server can request battery related operational data from the riding floor cleaning machine assembly. As mentioned above, this operational data can be stored on the riding floor cleaning machine assembly in memory of the PCB. In another example, the management server can request operational data for the vacuum and brush motors.

In another embodiment, the PCB can upload all operational data gathered since a last communication session with the management server. This operational data can include operational data for each of the battery, vacuum motor, traction motor, and brush motor.

In some embodiments, the management server is performing 708 at least one operational data analysis process on the obtained operational data.

Examples of operational data analysis include in one example, comparing the operational time frames for the riding floor cleaning machine assembly to an expected operational time frame. For example, the owner of a building will determine an operational time frame that the riding floor cleaning machine assembly should be utilized for. This operational time frame can be calculated from an expected time based on building square footage, or any other quantifiable metric that can be used to set an operational time frame threshold. Once this threshold is established, the management server can compare the actual operational time frame utilized over a given period of time to the operational time frame threshold. If the actual time does not meet or exceed the operational time frame threshold, the management server can alert the owner.

Thus, in some embodiments, the method includes transmitting 710 an alert message to an owner of the riding floor cleaning machine assembly if the operational analysis indicates that a threshold violating event has occurred. To be sure, a threshold violating event is any event in which operational data for one or more components of the riding floor cleaning machine assembly do not appropriately compare with an operational threshold.

In another example, an operational threshold could include a minimum charging time frame for the riding floor cleaning machine assembly. If the riding floor cleaning machine assembly is not charged for an appropriate amount of time, the battery operation of the riding floor cleaning machine assembly can be compromised.

In another example, an operational threshold can be set for the brush motor, which can include a comparison with another operational metric such as total operational time. Assume that the total operational time (e.g., power on to power off) for the riding floor cleaning machine assembly is one hour, but the brush motor is only operational for fifteen minutes of the one hour, it can be deduced that the riding floor cleaning machine assembly was not in actual use for the entire hour.

Additional metrics can be gathered by tracking revolutions of the drive/traction motor, which can be extrapolated into square foot coverage of the riding floor cleaning machine assembly. Ideally, drive/traction motor revolutions should be compared to overall operational time to ensure that the riding floor cleaning machine assembly is moving during power on periods. If the riding floor cleaning machine assembly is left on when no work is being accomplished, this can lead to unnecessary battery usage.

Knowledge of the approximate square footage of a cleaning area can also be used to determine if the riding floor cleaning machine assembly is being utilized properly. For example, if by counting drive/traction motor revolutions that the riding floor cleaning machine assembly has only cleaned approximately 400 square feet, when the total expected square footage for the cleaning area is 2,000 square feet, the management server can detect this discrepancy and transmit an alert message to the owner or another interested party.

Figure 21:
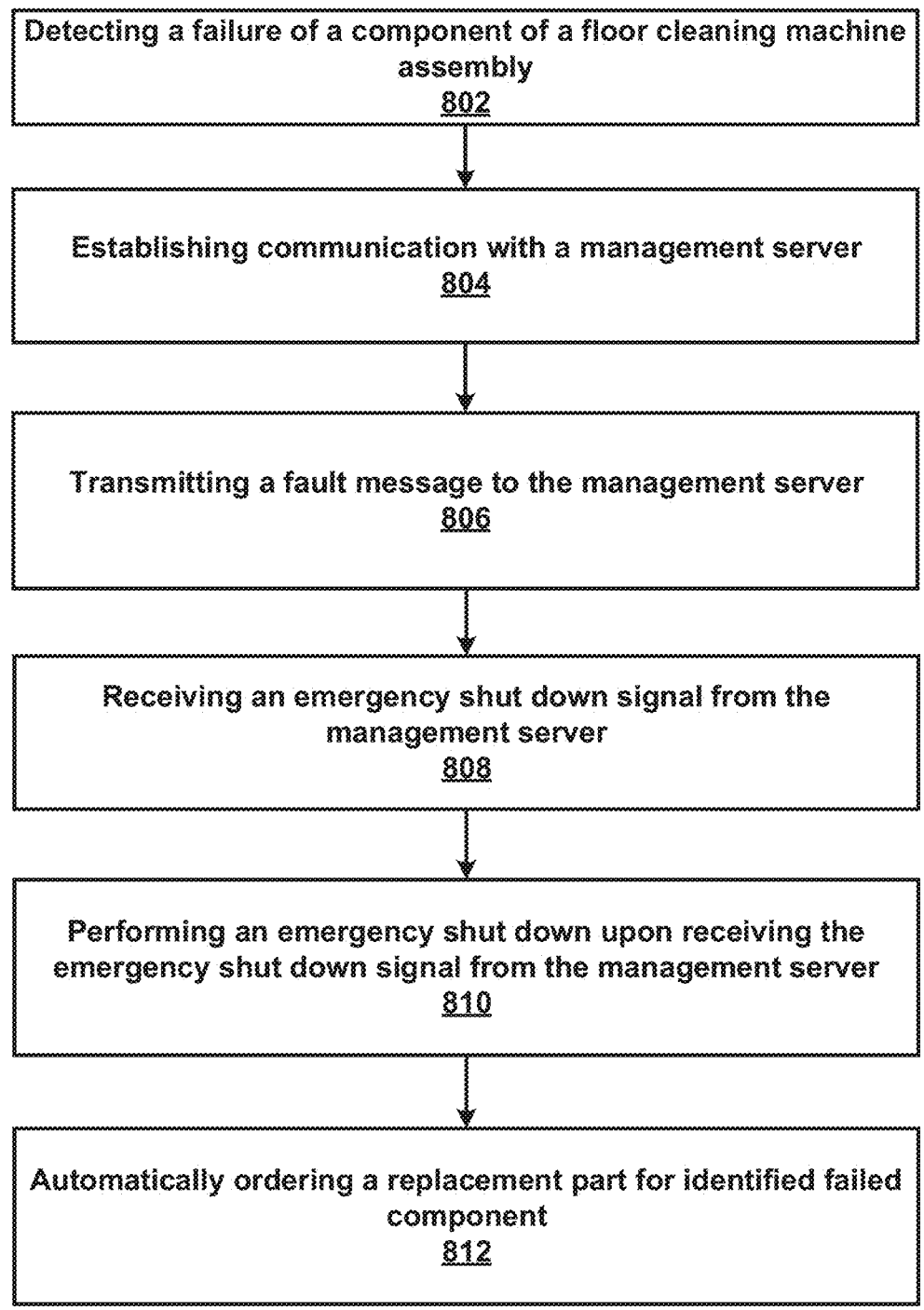
FIG. 21 of the drawings is a flow chart of another method in accordance with the present invention.

FIG. 21 is another flowchart of an example method of the present technology. The method includes a step of detecting 802 a failure of a component of a riding floor cleaning machine assembly during operation of the detecting 802 a failure of a component of a riding floor cleaning machine assembly during operation or startup of the riding floor cleaning machine assembly. For example, the PCB can maintain a set of operational thresholds for each component of the riding floor cleaning machine assembly such as the battery, vacuum motor, drive/traction motor, and brush motor. Whenever any of these components is operating below this expected operational threshold, the failure can be established.

Upon detection of a failure, the method includes the PCB establishing 804 communication with a management server, as well as a step of transmitting 806 a fault message to the management server. The fault message can include an indication as to the component that failed, such as a battery, vacuum motor, drive/traction motor, and brush motor.

If the failure involves a component of the riding floor cleaning machine assembly that could cause the riding floor cleaning machine assembly to be a safety hazard, the method can include the riding floor cleaning machine assembly receiving 808 an emergency shut down signal from the management server. The method also includes performing 810 an emergency shut down upon receiving the emergency shut down signal from the management server. Examples of emergency shut down procedures are described in greater detail supra.

In one embodiment, the method includes an optional step of automatically ordering 812 a replacement part for identified failed component. The riding floor cleaning machine assembly can communicate directly with a third party system over the network to order the replacement part. In another embodiment, the management server can identify the failed component and perform a lookup of the manufacturer of the failed component and forward the request to the third party system or a local inventory system. The management server can order the part automatically as the fault message is received. In another example, a replacement component in inventory can be identified in a repair ticket that is transmitted to a repair technician.

In some embodiments, the present invention enables upgrades to the software that end users are using that may address, for example, compatibility issues, or other necessary upgrades. In one embodiment, the management server can push updates to the riding floor cleaning machine assembly during operational data transfer operations, or upon powering up the riding floor cleaning machine assembly. For example, each time the riding floor cleaning machine assembly is powered on, the PCB can link with the management server and query the management server for updates. This can all occur transparently to the end user, unless a short pause in operation of the riding floor cleaning machine assembly is required to implement the update or for safety reasons.

Figure 22:
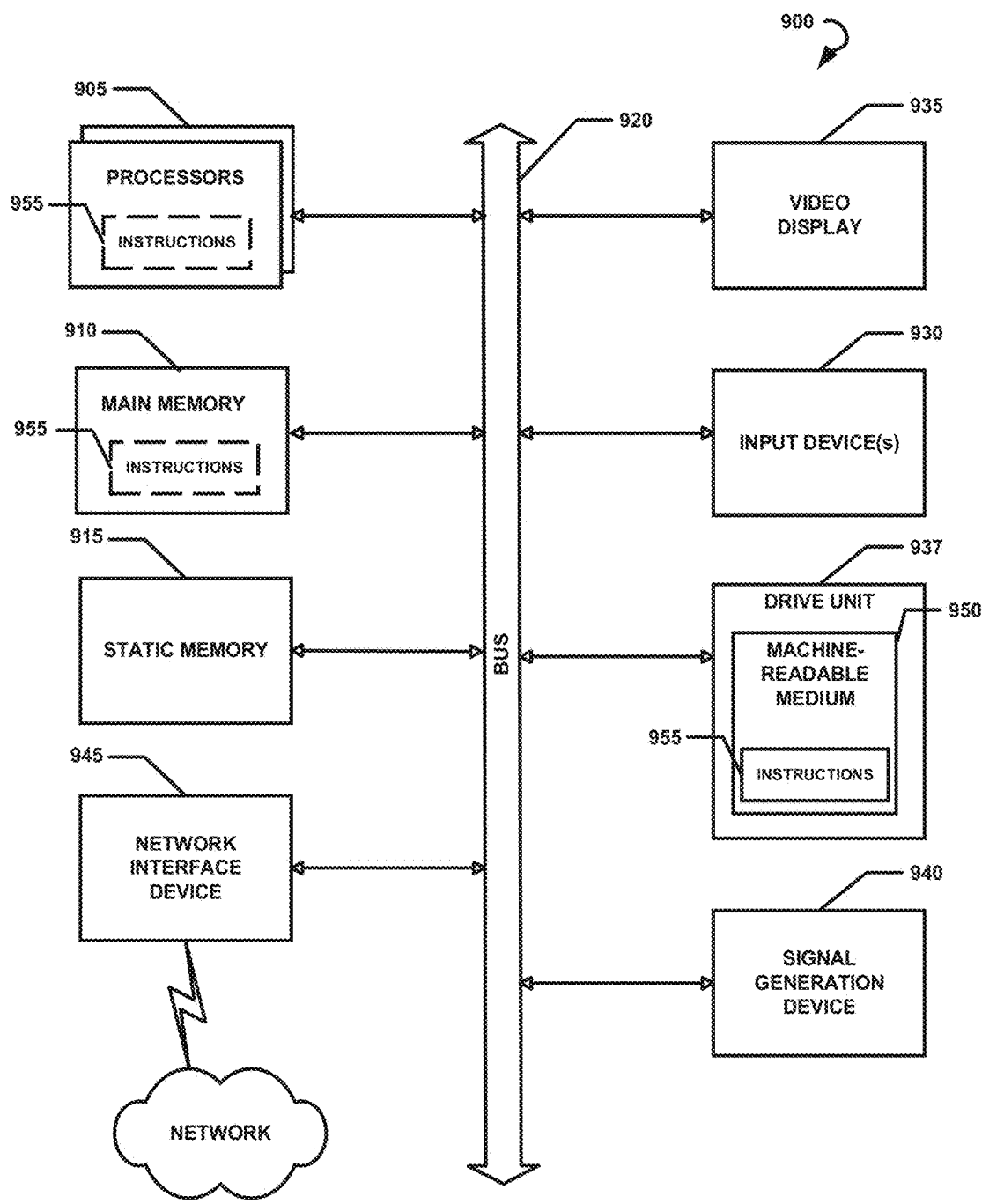
FIG. 22 of the drawings is a diagrammatic representation of a machine in the form of a computer system.

FIG. 22 is a diagrammatic representation of an example machine in the form of a computer system 900, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor or multiple processors 905 (e.g., a central processing unit (CPU), a graphics processing unit (GPU), or both), and a main memory 910 and static memory 915, which communicate with each other via a bus 920. The computer system 900 may further include a video display 935 (e.g., a liquid crystal display (LCD)). The computer system 900 may also include an alpha-numeric input device(s) 930 (e.g., a keyboard), a cursor control device (e.g., a mouse), a voice recognition or biometric verification unit (not shown), a drive unit 937 (also referred to as disk drive unit), a signal generation device 940 (e.g., a speaker), and a network interface device 945. The computer system 900 may further include a data encryption module (not shown) to encrypt data.

The disk drive unit 937 includes a computer or machine-readable medium 950 on which is stored one or more sets of instructions and data structures (e.g., instructions 955) embodying or utilizing any one or more of the methodologies or functions described herein. The instructions 955 may also reside, completely or at least partially, within the main memory 10 and/or within the processors 905 during execution thereof by the computer system 900. The main memory 910 and the processors 905 may also constitute machine-readable media.

The instructions 955 may further be transmitted or received over a network via the network interface device 945 utilizing any one of a number of well-known transfer protocols (e.g., Hyper Text Transfer Protocol (HTTP)). While the machine-readable medium 950 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The foregoing description merely explains and illustrates the invention and the invention is not limited thereto except insofar as the appended claims are so limited, as those skilled in the art who have the disclosure before them will be able to make modifications without departing from the scope of the invention.

What is claimed and desired to be secured by Letters Patent of the United States is:

1. A riding floor cleaning machine having an intelligent system, comprising:
a main frame sub-assembly; a steering and drive wheel sub-assembly; a solution tank sub-assembly; a recovery tank sub-assembly; a recovery tank cover sub-assembly; a control panel sub-assembly; a main controller sub-assembly; a seat and detergent system sub-assembly; a battery sub-assembly; a scrub head sub-assembly; a scrub head lift sub-assembly; a squeegee sub-assembly; a solution and detergent sub-assembly; and an intelligent system comprising a secondary electrochemical cell, wherein the secondary electrochemical cell includes an anode, a cathode, and an electrolyte, wherein at least one of the anode, cathode, and electrolyte are monitored by the intelligent system, and wherein the secondary electrochemical cell is in electrical communication with a controller, wherein the intelligent system at least one of selectively gathers, obtains, monitors, stores, records, and analyzes data associated with components of the riding floor cleaning machine.

2. The riding floor cleaning machine according to claim 1, wherein the controller communicatively couples the riding floor cleaning machine with a management server over a network and transmits data to the management server for analysis.

3. The riding floor cleaning machine according to claim 1, wherein the intelligent system is capable of transmitting a message to a management server.

4. The riding floor cleaning machine according to claim 3, wherein the message transmitted by the intelligent system includes at least one of hourly, daily, weekly, monthly, and yearly hours of operation of the riding floor cleaning machine.

5. The riding floor cleaning machine according to claim 3, wherein the message transmitted by the intelligent system includes at least one of hourly, daily, weekly, monthly, and yearly distance traveled by the riding floor cleaning machine.

* * * * *